United States Patent
Xu et al.

(10) Patent No.: US 11,610,291 B2
(45) Date of Patent: Mar. 21, 2023

(54) IMAGE PROCESSING METHOD, IMAGE PROCESSING DEVICE, ELECTRONIC DEVICE AND STORAGE MEDIUM

(71) Applicant: Hangzhou Glority Software Limited, Hangzhou (CN)

(72) Inventors: Qingsong Xu, Hangzhou (CN); Qing Li, Hangzhou (CN)

(73) Assignee: Hangzhou Glority Software Limited, Hangzhou (CN)

( * ) Notice: Subject to any disclaimer, the term of this patent is extended or adjusted under 35 U.S.C. 154(b) by 176 days.

(21) Appl. No.: 17/343,760

(22) Filed: Jun. 10, 2021

(65) Prior Publication Data
US 2022/0005163 A1  Jan. 6, 2022

(30) Foreign Application Priority Data

Jul. 2, 2020  (CN) .......................... 202010632679.1

(51) Int. Cl.
*G06T 5/00* (2006.01)
*G06T 7/13* (2017.01)

(52) U.S. Cl.
CPC ............... *G06T 5/006* (2013.01); *G06T 7/13* (2017.01); *G06T 2207/20008* (2013.01); *G06T 2207/20012* (2013.01)

(58) Field of Classification Search
CPC .... G06T 5/00; G06T 7/13; G06T 1/00; G06T 5/006; G06T 2207/20008;
(Continued)

(56) References Cited

U.S. PATENT DOCUMENTS

| 5,321,770 A * | 6/1994 | Huttenlocher ....... G06V 30/414 |
| | | 382/229 |
| 2010/0008574 A1* | 1/2010 | Ishiga ...................... H04N 9/69 |
| | | 382/167 |

(Continued)

FOREIGN PATENT DOCUMENTS

CN  112990150 A  *  6/2021  ......... G06K 9/00463

OTHER PUBLICATIONS

The Manual of Photography Tenth Edition by Elizabeth Allen and Sophie Triantaphillidou—2009 (Year: 2009).*

(Continued)

*Primary Examiner* — Nizar N Sivji
(74) *Attorney, Agent, or Firm* — JCIP Global Inc.

(57) ABSTRACT

An image processing method, an image processing device, an electronic device, and a non-transitory computer readable storage medium are provided. The image processing method includes: obtaining an input image which includes M character rows; performing global correction processing on the input image to obtain an intermediate corrected image; determining the M character row lower boundaries corresponding to the M character rows according to the intermediate corrected image; and determining the local adjustment reference line and M retention coefficient groups based on the intermediate corrected image and the M character row lower boundaries; determining M local adjustment offset groups corresponding to the M character rows according to the M character row lower boundaries, the local adjustment reference line and the M retention coefficient groups; performing local adjustment on the M character rows in the intermediate corrected image according to the M local adjustment offset groups to obtain the target corrected image.

20 Claims, 15 Drawing Sheets

(58) Field of Classification Search
CPC .......... G06T 2207/20012; G06V 10/22; G06V 30/244; G06V 30/162; G06V 30/414; G06V 30/18076; G06V 10/243; G06V 30/153

See application file for complete search history.

(56) References Cited

U.S. PATENT DOCUMENTS

| | | | | |
|---|---|---|---|---|
| 2010/0073735 | A1* | 3/2010 | Hunt | G06V 30/1478 |
| | | | | 358/462 |
| 2011/0044539 | A1* | 2/2011 | Kimura | G06V 30/414 |
| | | | | 382/176 |
| 2011/0222768 | A1* | 9/2011 | Galic | G06V 10/28 |
| | | | | 382/170 |
| 2018/0211107 | A1* | 7/2018 | Segalovitz | G06V 30/413 |
| 2020/0219202 | A1* | 7/2020 | Macciola | H04N 1/00403 |
| 2021/0193059 | A1* | 6/2021 | Kimura | G09G 3/3426 |
| 2022/0044367 | A1* | 2/2022 | Xu | G06T 7/13 |

OTHER PUBLICATIONS

Gradient-Based Learning Applied to Document Recognition—1998 (Year: 1998).*
High Dynamic Range Image Acquisition Using Flash Image—2013 (Year: 2013).*
Text String Detection From Natural Scenes by Structure-Based Partition and Grouping—2011 (Year: 2011).*
Document Analysis—From Pixels to Contents—1992 (Year: 1992).*

* cited by examiner

IMAGE PROCESSING METHOD, IMAGE PROCESSING DEVICE, ELECTRONIC DEVICE AND STORAGE MEDIUM

CROSS-REFERENCE TO RELATED APPLICATION

This application claims the priority benefit of China application serial no. 202010632679.1, filed on Jul. 2, 2020. The entirety of the above-mentioned patent application is hereby incorporated by reference herein and made a part of this specification.

BACKGROUND

Field of the Disclosure

The embodiments of the present disclosure relate to an image processing method, an image processing device, an electronic device, and a non-transitory computer readable storage medium.

Description of Related Art

With the development of digital technology, paper files can be scanned or photographed to be converted into electronic text images, which can be easily stored and transmitted through the Internet. In addition, the text image can be recognized by text recognition technology to obtain the information recorded in the text image. However, in the process of converting a paper file into a text image, the text image may be inclined, etc., and the inclination will have an adverse effect on the analysis (for example, text recognition, etc.) of the text image. Therefore, it is necessary to correct the text image so that the information recorded in the text image can be stored and transmitted more accurately.

SUMMARY OF THE DISCLOSURE

At least one embodiment of the present disclosure provides an image processing method, including: obtaining an input image, wherein the input image includes M character rows, each character row in the M character rows includes at least one character, and M is a positive integer; performing the global correction processing on the input image to obtain an intermediate corrected image; performing the local adjustment on the intermediate corrected image to obtain a target corrected image. The step of performing the local adjustment on the intermediate corrected image to obtain a target corrected image includes: determining the M character row lower boundaries corresponding to the M character rows according to the intermediate corrected image; and determining the local adjustment reference line and M retention coefficient groups based on the intermediate corrected image and the M character row lower boundaries, wherein each retention coefficient group in the M retention coefficient groups includes multiple retention coefficients; determining M local adjustment offset groups corresponding to the M character rows according to the M character row lower boundaries, the local adjustment reference line and the M retention coefficient groups, wherein each local adjustment offset group in the M local adjustment offset groups includes multiple local adjustment offsets; performing local adjustment on the M character rows in the intermediate corrected image according to the M local adjustment offset groups to obtain the target corrected image.

For example, in the image processing method provided by an embodiment of the present disclosure, the step of determining the M character row lower boundaries corresponding to the M character rows according to the intermediate corrected image includes: performing the character connection processing on the intermediate corrected image to obtain a first character connected image, wherein the first character connected image includes M first character connected areas corresponding to the M character rows; and determining the M character row lower boundaries corresponding to the M character rows according to the M first character connected areas and the intermediate corrected image.

For example, in the image processing method provided by an embodiment of the present disclosure, the step of determining the M character row lower boundaries corresponding to the M character rows according to the M first character connected areas and the intermediate corrected image includes: determining the M area lower boundaries corresponding to the M first character connected areas one-to-one; performing the boundary fitting processing on the M character rows to obtain the M character row lower boundaries according to the M area lower boundaries and the intermediate corrected image, wherein the M character rows include the i1-th character row, the i1-th character row corresponds to the first character connected area which corresponds to the lower boundary of the i1-th area in the M area lower boundaries, it is a positive integer less than or equal to M. The step of performing the boundary fitting process on the i1-th character row includes: obtaining at least one pixel of each character in the i1-th character row closest to the lower boundary of the i1-th area; removing the noise pixel in the at least one pixel to obtain the target pixel; performing the linear or quadratic fitting on the target pixel to obtain the character row lower boundary corresponding to the i1-th character row.

For example, in the image processing method provided by an embodiment of the present disclosure, the step of determining the M local adjustment offset groups corresponding to the M character rows according to the M character row lower boundaries, the local adjustment reference line and the M retention coefficient groups includes: determining the M local adjustment reference points corresponding to the M character row lower boundaries according to the local adjustment reference line; for the i2-th character row lower boundary in the M character row lower boundaries, determining the local adjustment reference point corresponding to the i2-th character row lower boundary in the M local adjustment reference points, wherein i2 is a positive integer less than or equal to M; determining the i2-th character row corresponding to the i2-th character row lower boundary in the M character rows; determining the local character row area corresponding to the i2-th character row according to the height of the character rows and the i2-th character row; determining the multiple reference character offsets corresponding to the i2-th character row lower boundary according to the i2-th character row lower boundary and the local adjustment reference point corresponding to the i2-th character row lower boundary; in response to that the local character row area corresponding to the i2-th character row does not overlap the local character row area corresponding to any one of remaining character row in the M character rows, determining the local adjustment offset corresponding to each pixel in the local character row area corresponding to the i2-th character row according to the multiple reference character offsets corresponding to the i2-th character row and the retention coefficient group corresponding to the local character row area corresponding to the i2-th character row in the M retention coefficient groups, wherein the M local adjustment offset groups include a local adjustment offset group corresponding to the i2-th character row, and the local adjustment offset group corresponding to the i2-th character row includes the local adjustment offset corresponding to each pixel in the local character row area corresponding to the i2-th character row.

For example, in the image processing method provided by an embodiment of the present disclosure, the step of determining the M local adjustment offset groups corresponding to the M character rows according to the M character row lower boundaries, the local adjustment reference line and the M retention coefficient groups further includes: for the i3-th character row lower boundary in the M character row lower boundaries, determining the local adjustment reference point corresponding to the i3-th character row lower boundary in the M local adjustment reference points, wherein i3 is a positive integer less than or equal to M, i2 and i3 are not equal to each other; determining the i3-th character row corresponding to the i3-th character row lower boundary in the M character rows; determining the local character row area corresponding to the i3-th character row according to the height of the character row and the i3-th character row; determining the multiple reference character offsets corresponding to the i3-th character row according to the i3-th character row lower boundary and the local adjustment reference point corresponding to the i3-th character row lower boundary; in response to that the local character row area corresponding to the i2-th character row partially overlaps the local character row area corresponding to the i3-th character row: for the overlapped area between the local character row area corresponding to the i2-th character row and the local character row area corresponding to the i3-th character row, determining the local adjustment offset of each pixel in the overlapped area according to the multiple reference character offsets corresponding to the i2-th character row and the multiple reference character offsets corresponding to the i3-th character row, for each pixel in the non-overlapped area outside the overlapped area in the local character area corresponding to the i2-th character row, determining the local adjustment offset corresponding to each pixel in the non-overlapped area of the local character row area corresponding to the i2-th character row according to the multiple reference character offsets corresponding to the i2-th character row and the retention coefficient group corresponding to the local character row area corresponding to the i2-th character row in the M retention coefficient groups, wherein the local adjustment offset group corresponding to the i2-th character row in the M local adjustment offset groups includes the local adjustment offset corresponding to each pixel in the non-overlapped area of the local character row area corresponding to the i2-th character row and the local adjustment offset of each pixel in the overlapped area; for each pixel in the non-overlapped area outside the overlapped area in the local character row area corresponding to the i3-th character row, determining the local adjustment offset corresponding to each pixel in the non-overlapped area in the local character row area corresponding to the i3-th character row according to the multiple reference character offsets corresponding to the i3-th character row and the retention coefficient groups corresponding to the local character row area corresponding to the i3-th character row in the M coefficient groups, wherein the local adjustment offset group offset groups corresponding to the i3-th character row includes the local adjustment offset corresponding to each pixel in the non-overlapped area of the local character row area corresponding to the i3-th character row and the local adjustment offset of each pixel in the overlapped area.

For example, in the image processing method provided by an embodiment of the present disclosure, the step of determining the M local adjustment reference points corresponding to the M character row lower boundaries according to the local adjustment reference line includes for each of the M character row lower boundaries, under the condition that there is an intersection between the character row lower boundary and the local adjustment reference line, determining the local adjustment reference point corresponding to the character row lower boundary as the intersection; under the condition that there is no intersection between the character row lower boundary and the local adjustment reference line, determining the local adjustment reference point corresponding to the character row lower boundary as the point on the character row lower boundary closest to the local adjustment reference line.

For example, in the image processing method provided by an embodiment of the present disclosure, the value range of the retention coefficient in each of the retention coefficient groups is 0 to 1, and the step of determining the M retention coefficient groups includes: for the i4-th character row in the M character rows, determining the local character row area corresponding to the i4-th character row, wherein i4 is a positive integer less than or equal to M; for each pixel in the local character row area, obtaining the point on the character row lower boundary corresponding to the i4-th character row closest to the pixel as the reference pixel; determining the attenuation value corresponding to the pixel according to the distance between the pixel and the reference pixel; determining the retention coefficient corresponding to the pixel according to the attenuation value, thereby determining the retention coefficient group corresponding to the local character row area corresponding to the i4-th character row, wherein the M retention coefficient groups include the retention coefficient groups corresponding to local character row area corresponding to the i4-th character row.

For example, in the image processing method provided by an embodiment of the present disclosure, the M character rows are arranged along a first direction, and the step of determining the local adjustment reference line includes: using the middle line extending in the first direction in the intermediate corrected image as the local adjustment reference line.

For example, in the image processing method provided by an embodiment of the present disclosure, the step of performing local adjustment on the M character rows in the intermediate corrected image according to the M local adjustment offset groups to obtain the target corrected image includes: determining the local character row area corresponding to the M character rows in the intermediate corrected image; performing the linear local adjustment on the pixels in the local character row area corresponding to the M character rows respectively to obtain the target corrected image according to the M local adjustment offset group.

For example, in the image processing method provided by an embodiment of the present disclosure, the step of performing the global correction processing on the input image to obtain an intermediate corrected image includes: performing the binarization processing on the input image to obtain a binarized image; performing the character connection processing on the binarized image to obtain a second character connected image, wherein the second character connected image includes M second character connected areas corresponding to the M character rows; acquiring M middle lines corresponding to the M second character connected areas one-to-one, wherein the M second character connected areas are arranged along the first direction; setting W first division lines, wherein W first division lines extend along the first direction; acquiring multiple first intersections between the M middle lines and the W first division lines; performing a quadratic fitting based on the multiple first intersections to obtain W quadratic functions corresponding to the W first division lines one-to-one; setting the Q second division lines, wherein the Q second division lines extend along the second direction, and the first direction and the second direction are perpendicular to each other; obtaining multiple second intersections between the W first division lines and the Q second division lines; calculating the global adjustment offset of the multiple second intersections based on the W quadratic functions; performing the global correction processing on the binarized image according to the global adjustment offset of the multiple second intersections to obtain the intermediate corrected image.

For example, in the image processing method provided by an embodiment of the present disclosure, the step of performing the quadratic fitting based on the multiple first intersections to obtain W quadratic functions corresponding to the W first division lines one-to-one includes determining a coordinate system based on the input image, wherein the coordinate system includes an X axis and a Y axis, the first direction is parallel to the Y axis, and the second direction is parallel to the X axis; determining the coordinate value of the multiple character center points corresponding to the first intersections in the coordinate system; calculating the global adjustment offset of the multiple first intersections based on the multiple character center points; performing the quadratic fitting on the global adjustment offset of the multiple first intersections to obtain the W quadratic functions corresponding to the W first division lines one-to-one.

For example, in the image processing method provided by an embodiment of the present disclosure, for each first intersection in the multiple first intersections, the global adjustment offset of the first intersection includes the difference between the Y-axis coordinate value of the first intersection in the coordinate system and the Y-axis coordinate value of the character center point corresponding to the first intersection in the coordinate system.

At least one embodiment of the present disclosure provides an image processing device, including: an acquisition module for obtaining an input image, wherein the input image includes M character rows, and each character row in the M character rows includes at least one character, and M is a positive integer; a global correction module configured to perform the global correction processing on the input image to obtain an intermediate corrected image; a local adjustment module configured to perform the local adjustment on the intermediate corrected image to obtain the target corrected image; wherein the step of performing the local adjustment on the intermediate corrected image by the local adjustment module to obtain the target corrected image includes the following operations: determining the M character row lower boundaries corresponding to the M character rows according to the intermediate corrected image; determining the local adjustment reference line and M retention coefficient groups based on the intermediate corrected image and the M character row lower boundaries, wherein each retention coefficient group in the M retention coefficient groups includes multiple retention coefficients; determining M local adjustment offset groups corresponding to the M character rows according to the M character row lower boundaries, the local adjustment reference line and the M retention coefficient groups, wherein each local adjustment offset group in the M local adjustment offset groups includes multiple local adjustment offsets; performing the local adjustment on the M character rows in the intermediate corrected image according to the M local adjustment offset groups to obtain the target corrected image.

For example, in the image processing device provided by an embodiment of the present disclosure, the operation of determining, by the local adjustment module, the M character row lower boundaries corresponding to the M character rows according to the intermediate corrected image includes the following operations: performing the character connection processing on the intermediate corrected image to obtain a first character connected image, wherein the first character connected image includes M first character connected areas corresponding to the M character rows; and determining the M character row lower boundaries corresponding to the M character rows according to the M first character connected areas and the intermediate corrected image.

For example, in the image processing device provided by an embodiment of the present disclosure, the operation of determining, by the local adjustment module, the M character row lower boundaries corresponding to the M character rows according to the M first character connected areas and the intermediate corrected image includes the following operations: determining the M area lower boundaries corresponding to the M first character connected areas one-to-one; performing the boundary fitting processing on the M character rows to obtain the M character row lower boundaries according to the M area lower boundaries and the intermediate corrected image, wherein the M character rows include the i1-th character row, the i1-th character row corresponds to the first character connected area which corresponds to the lower boundary of the i1-th area in the M area lower boundaries, i1 is a positive integer less than or equal to M. The operation of performing the boundary fitting process on the i1-th character row includes: obtaining at least one pixel of each of the at least one character in the it-th character row closest to the lower boundary of the i1-th area; removing the noise pixel in the at least one pixel to obtain the target pixel; performing the linear or quadratic fitting on the target pixel to obtain the character row lower boundary corresponding to the i1-th character row.

For example, in the image processing device provided by an embodiment of the present disclosure, the operation of determining, by the local adjustment module, the M local adjustment offset groups corresponding to the M character rows according to the M character row lower boundaries, the local adjustment reference line and the M retention coefficient groups includes the following operations: determining the M local adjustment reference points corresponding to the M character row lower boundaries according to the local adjustment reference line; for the i2-th character row lower boundary in the M character row lower boundaries, determining the local adjustment reference point corresponding to the i2-th character row lower boundary in the M local adjustment reference points, wherein i2 is a positive integer less than or equal to M; determining the i2-th character row corresponding to the i2-th character row lower boundary in the M character rows; determining the local character row area corresponding to the i2-th character row according to the height of the character rows and the i2-th character row; determining the multiple reference character offsets corresponding to the i2-th character row lower boundary according to the i2-th character row lower boundary and the local adjustment reference point corresponding to the i2-th character row lower boundary; in response to that the local character row area corresponding to the i2-th character row does not overlap the local character row area corresponding to any one of remaining character row in the M character rows, determining the local adjustment offset corresponding to each pixel in the local character row area corresponding to the i2-th character row according to the multiple reference character offsets corresponding to the i2-th character row and the retention coefficient group corresponding to the local character row area corresponding to the i2-th character row in the M retention coefficient groups, wherein the M local adjustment offset groups include a local adjustment offset group corresponding to the i2-th character row, and the local adjustment offset group corresponding to the i2-th character row includes the local adjustment offset corresponding to each pixel in the local character row area corresponding to the i2-th character row.

For example, in the image processing device provided by an embodiment of the present disclosure, the operation of determining, by the local adjustment module, the M local adjustment offset groups corresponding to the M character rows according to the M character row lower boundaries, the local adjustment reference line and the M retention coefficient groups further includes the following operations: for the i3-th character row lower boundary in the M character row lower boundaries, determining the local adjustment reference point corresponding to the i3-th character row lower boundary in the M local adjustment reference points, wherein i3 is a positive integer less than or equal to M, i2 and i3 are not equal to each other; determining the i3-th character row corresponding to the i3-th character row lower boundary in the M character rows; determining the local character row area corresponding to the i3-th character row according to the height of the character row and the i3-th character row; determining the multiple reference character offsets corresponding to the i3-th character row according to the i3-th character row lower boundary and the local adjustment reference point corresponding to the i3-th character row lower boundary; in response to that the local character row area corresponding to the i2-th character row partially overlaps the local character row area corresponding to the i3-th character row: for the overlapped area between the local character row area corresponding to the i2-th character row and the local character row area corresponding to the i3-th character row, determining the local adjustment offset of each pixel in the overlapped area according to the multiple reference character offsets corresponding to the i2-th character row and the multiple reference character offsets corresponding to the i3-th character row, for each pixel in the non-overlapped area outside the overlapped area in the local character area corresponding to the i2-th character row, determining the local adjustment offset corresponding to each pixel in the non-overlapped area of the local character row area corresponding to the i2-th character row according to the multiple reference character offset corresponding to the i2-th character row and the retention coefficient group corresponding to the local character row area corresponding to the i2-th character row in the M retention coefficient groups, wherein the local adjustment offset group corresponding to the i2-th character row in the M local adjustment offset groups includes the local adjustment offset of each pixel in the non-overlapped area of the local character row area corresponding to the i2-th character row and the local adjustment offset of each pixel in the overlapped area; for each pixel in the non-overlapped area outside the overlapped area in the local character row area corresponding to the i3-th character row, determining the local adjustment offset corresponding to each pixel in the non-overlapped area in the local character row area corresponding to the i3-th character row according to the multiple reference character offsets corresponding to the i3-th character row and the retention coefficient groups corresponding to the local character row area corresponding to the i3-th character row in the M retention coefficient groups, wherein the local adjustment offset group corresponding to the i3-th character row in the M local adjustment offset groups includes the local adjustment offset of each pixel in the non-overlapped area corresponding to the local character row area corresponding to the i3-th character row and the local adjustment offset of each pixel in the overlapped area.

For example, in an image processing device provided by an embodiment of the present disclosure, the operation of performing, by the global correction module, the global correction processing on the input image to obtain an intermediate corrected image includes the following operations: performing the binarization processing on the input image to obtain a binarized image; performing the character connection processing on the binarized image to obtain a second character connected image, wherein the second character connected image includes M second character connected areas corresponding to the M character rows; acquiring M middle lines corresponding to the M second character connected areas one-to-one, wherein the M second character connected areas are arranged along the first direction; setting W first division lines, wherein the W first division lines extend along the first direction; acquiring multiple first intersections between the M middle lines and the W first division lines; obtaining W quadratic functions corresponding to the W first division lines one-to-one based on the quadratic fitting performed on the multiple first intersections; setting the Q second division lines, wherein the Q second division lines extend along the second direction, and the first direction and the second direction are perpendicular to each other; obtaining multiple second intersections between the W first division lines and the Q second division lines; calculating the global adjustment offset of the multiple second intersections based on the W quadratic functions; performing the global correction processing on the binarized image according to the global adjustment offset of the multiple second intersections to obtain the intermediate corrected image.

At least one embodiment of the present disclosure provides an electronic device, including: a memory for non-transitory storage of computer-readable instructions; a processor for running the computer-readable instructions, wherein the image processing method as described in any embodiment of the present disclosure is implemented when the computer-readable instructions are executed by the processor.

At least one embodiment of the present disclosure provides a non-transitory computer readable storage medium, wherein the non-transitory computer readable storage medium stores computer-readable instructions, wherein the image processing method as described in any embodiment of the present disclosure is implemented when the computer-readable instructions are executed by the processor.

BRIEF DESCRIPTION OF THE DRAWINGS

In order to explain the technical solutions of the embodiments of the present disclosure more clearly, the drawings of the embodiments will be briefly introduced below. Obviously, the drawings in the following description only relate to some embodiments of the present disclosure, rather than limit the present disclosure.

FIG. 4A is a schematic view of an intermediate corrected image provided by some embodiments of the present disclosure.

FIG. 4C is a schematic view of an intermediate corrected image including a plurality of pixels corresponding to a character row lower boundary provided by some embodiments of the present disclosure.

FIG. 4F is a schematic view of an overlapped area provided by some embodiments of the present disclosure.

FIG. 5A is a schematic view of a binarized image of an input image provided by some embodiments of the present disclosure.

FIG. 7A is a schematic view of a target corrected image provided by some embodiments of the present disclosure.

DESCRIPTION OF EMBODIMENTS

Figure 1:
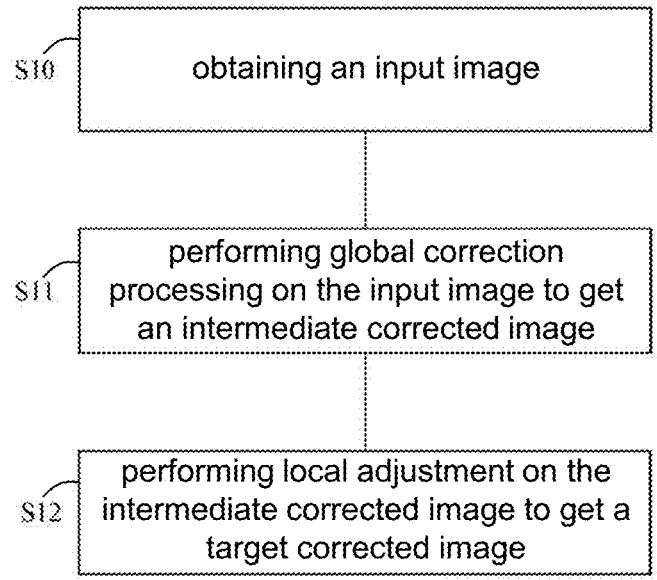
FIG. 1 is a schematic flowchart of an image processing method provided by at least one embodiment of the present disclosure.

In order to make the objectives, technical solutions, and advantages of the embodiments of the present disclosure clearer, the technical solutions of the embodiments of the present disclosure will be described clearly and thoroughly with reference to the accompanying drawings of the embodiments of the present disclosure. Obviously, the described embodiments are part of the embodiments of the present disclosure, rather than all of the embodiments. Based on the described embodiments of the present disclosure, all other embodiments obtained by those of ordinary skill in the art without inventive effort fall within the protection scope of the present disclosure.

Unless otherwise defined, the technical terms or scientific terms used in the present disclosure shall have the common meanings comprehensible by those with ordinary skills in the field to which this disclosure belongs. The "first", "second" and similar words used in the present disclosure do not indicate any order, quantity or importance, but are only used to distinguish different components. The terms "include" or "comprises" and other similar words mean that the element or item appearing before the word covers the element or item listed after the word and their equivalents, but does not exclude other elements or items. Terms such as "connected" or "linked" and similar words are not limited to physical or mechanical connections, but may include electrical connections, regardless direct or indirect. Terms "Up", "Down", "Left", "Right", etc. are only used to indicate the relative position relationship. When the absolute position of the described object changes, the relative position relationship may also change accordingly.

In order to keep the following description of the embodiments of the present disclosure clear and concise, the present disclosure omits detailed descriptions of some known functions and known components.

At least one embodiment of the present disclosure provides an image processing method, an image processing device, an electronic device, and a non-transitory computer readable storage medium. The image processing method includes: obtaining an input image, wherein the input image includes M character rows, each character row in the M character rows includes at least one character, and M is a positive integer; performing global correction processing on the input image to obtain an intermediate corrected image; performing local adjustment on the intermediate corrected image to obtain a target corrected image. The step of performing local adjustment on the intermediate corrected image to obtain a target corrected image includes: determining the M character row lower boundaries corresponding to the M character rows according to the intermediate corrected image; and determining the local adjustment reference line and M retention coefficient groups based on the intermediate corrected image and the M character row lower boundaries, wherein each retention coefficient group in the M retention coefficient groups includes multiple retention coefficients; determining M local adjustment offset groups corresponding to the M character rows according to the M character row lower boundaries, the local adjustment reference line and the M retention coefficient groups, wherein each local adjustment offset group in the M local adjustment offset groups includes multiple local adjustment offsets; performing local adjustment on the M character rows in the intermediate corrected image according to the M local adjustment offset groups to obtain the target corrected image.

In the image processing method provided by the embodiment of the present disclosure, global correction is performed first on the input image to get an intermediate corrected image, and then local adjustment is performed on the intermediate corrected image to determine the target corrected image. The local adjustment can be performed to make some supplementary correction directed at some details that are neglected in the global correction process. In this way, it is possible to avoid that some unsmooth areas generated due to the details neglected in the global correction process still exist in some details of the images subjected to the global correction process, and avoid that the detailed parts are not corrected. Therefore, local adjustments are required to further process the images in order to improve the accuracy of the correction.

The image processing method provided by the embodiment of the present disclosure may be applied to the image processing device provided by the embodiment of the present disclosure, and the image processing device may be configured on an electronic device. The electronic device may be a personal computer, a mobile terminal, etc., and the mobile terminal may be a hardware device such as a mobile phone or a tablet computer.

The embodiments of the present disclosure will be described in detail below with reference to the accompanying drawings, but the present disclosure is not limited to these specific embodiments.

Figure 2:
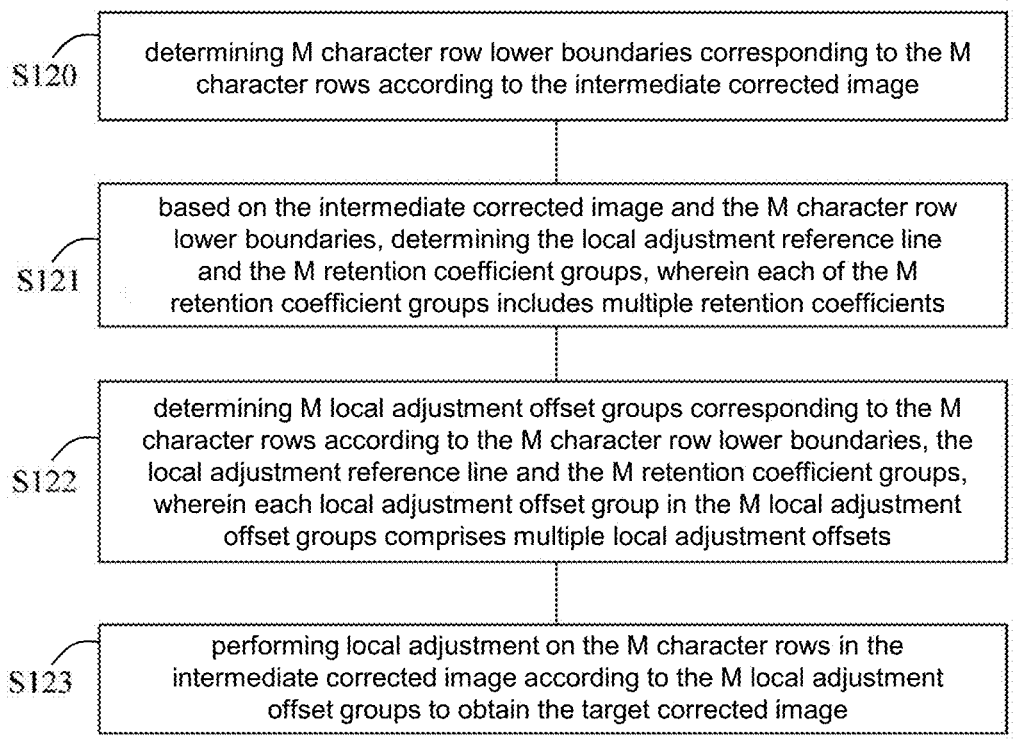
FIG. 2 is a schematic flowchart of step S12 in the image processing method shown in FIG. 1.
Figure 3:
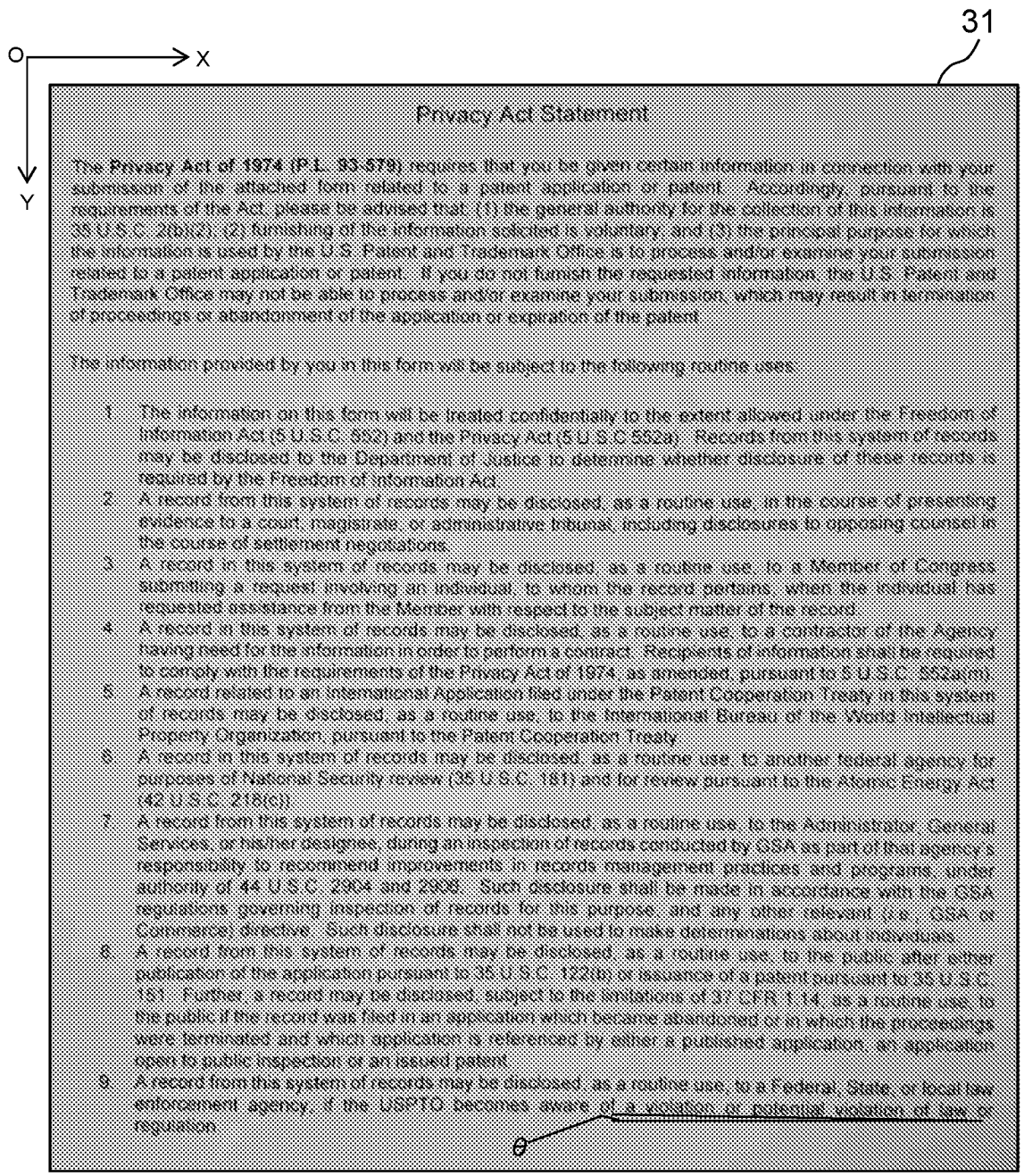
FIG. 3 is a schematic view of an input image provided by at least one embodiment of the present disclosure.

FIG. 1 is a schematic flowchart of an image processing method provided by at least one embodiment of the present disclosure. FIG. 2 is a schematic flowchart of step S12 in the image processing method shown in FIG. 1. FIG. 3 is a schematic view of an input image provided by at least one embodiment of the present disclosure.

As shown in FIG. 1, the image processing method provided by an embodiment of the present disclosure includes steps S10 to S12. First, in step S10, an input image is obtained; in step S11, global correction processing is performed on the input image to get an intermediate corrected image; in step S12, local adjustment is performed on the intermediate corrected image to get the target corrected image.

For example, in step S10, the input image includes M character rows, each character row in the M character rows includes at least one character, and M is a positive integer. The characters in each character row may be arranged along the second direction, the M character rows may be arranged along the first direction, and the first direction and the second direction may be substantially perpendicular to each other. The second direction may be a horizontal direction, and may be a vertical direction. For example, as shown in FIG. 3, in some embodiments, the first direction may be the Y-axis direction, that is, the vertical direction, and the second direction may be the X-axis direction, that is, the horizontal direction.

As shown in FIG. 3, M character rows can include the character "Privacy", the character "Act", the character "Statement", the character "The", the character "1974", the character "requires", the character "that", and the character "you", etc., wherein the character "Privacy", the character "Act", and the character "Statement" are arranged in the same character row (for example, the first row), and the character "The", the character "1974", the character "requires", the character "that", and the character "you", etc. are arranged in the same character row (for example, the second row).

For example, each character can be numbers, Chinese characters (Chinese text, Chinese words, etc.), foreign characters (for example, foreign letters, foreign words, etc.), special characters (for example, percent sign "%"), punctuation marks, and graphics, etc.

For example, the input image is an image obtained by a user taking a photo of an object, the object includes characters, and the object may be, for example, business cards, test papers, documents, invoices, and so on. As shown in FIG. 3, in some embodiments, the input image 31 may be an image obtained by photographing a document.

For example, in the input image 31, each character may be inclined with respect to the horizontal direction or the vertical direction. As shown in FIG. 3, a coordinate system OXY is determined with the upper left corner of the input image 31 as the coordinate origin, the X-axis extends to the right and the Y-axis extends downwards. For example, the horizontal direction can be the X-axis direction, and the vertical direction can be the Y-axis direction. The characters "violation", "or", "potential", "law", etc. are arranged in a row, and the angle between the character row and the horizontal direction (that is, the X-axis direction) is θ, that is, the angle at which the character row is inclined with respect to the horizontal direction is θ. It should be noted that in FIG. 3, in order to clearly show the coordinate system, the origin of the coordinate system and the pixel in the upper left corner of the input image 31 do not overlap each other. However, those skilled in the art should know that the origin of the coordinate system can coincide with the pixel in the upper left corner of the input image 31. The present disclosure is not limited thereto. In other embodiments, the origin of the coordinate system may also coincide with the pixel at the center of the input image 31.

For example, the shape of the input image can be a rectangle or the like. The shape and size of the input image can be set by the user according to the actual situation.

For example, the input image can be an image taken by a digital camera or a mobile phone, and the input image can be a grayscale image or a color image. For example, the input image may be an original image directly captured by an image capturing device, or an image obtained by preprocessing the original image. For example, in order to prevent the data quality and data imbalance of the input image from affecting the object edge detection, before the input image is processed, the image processing method may further include preprocessing the input image. The step of preprocessing can eliminate irrelevant information or noise information in the input image, so as to better process the input image.

Figure 4A:
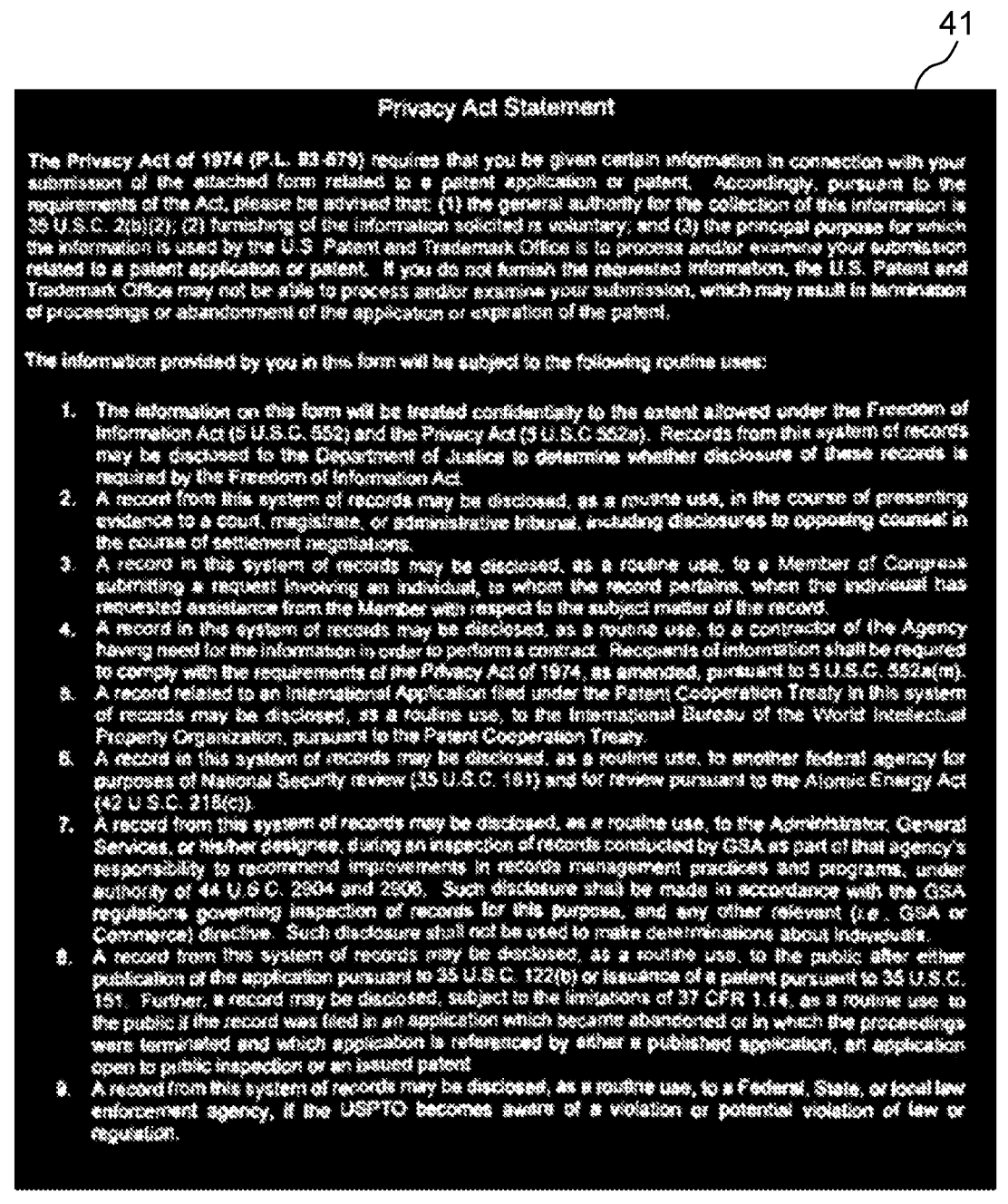
Figure 4B:
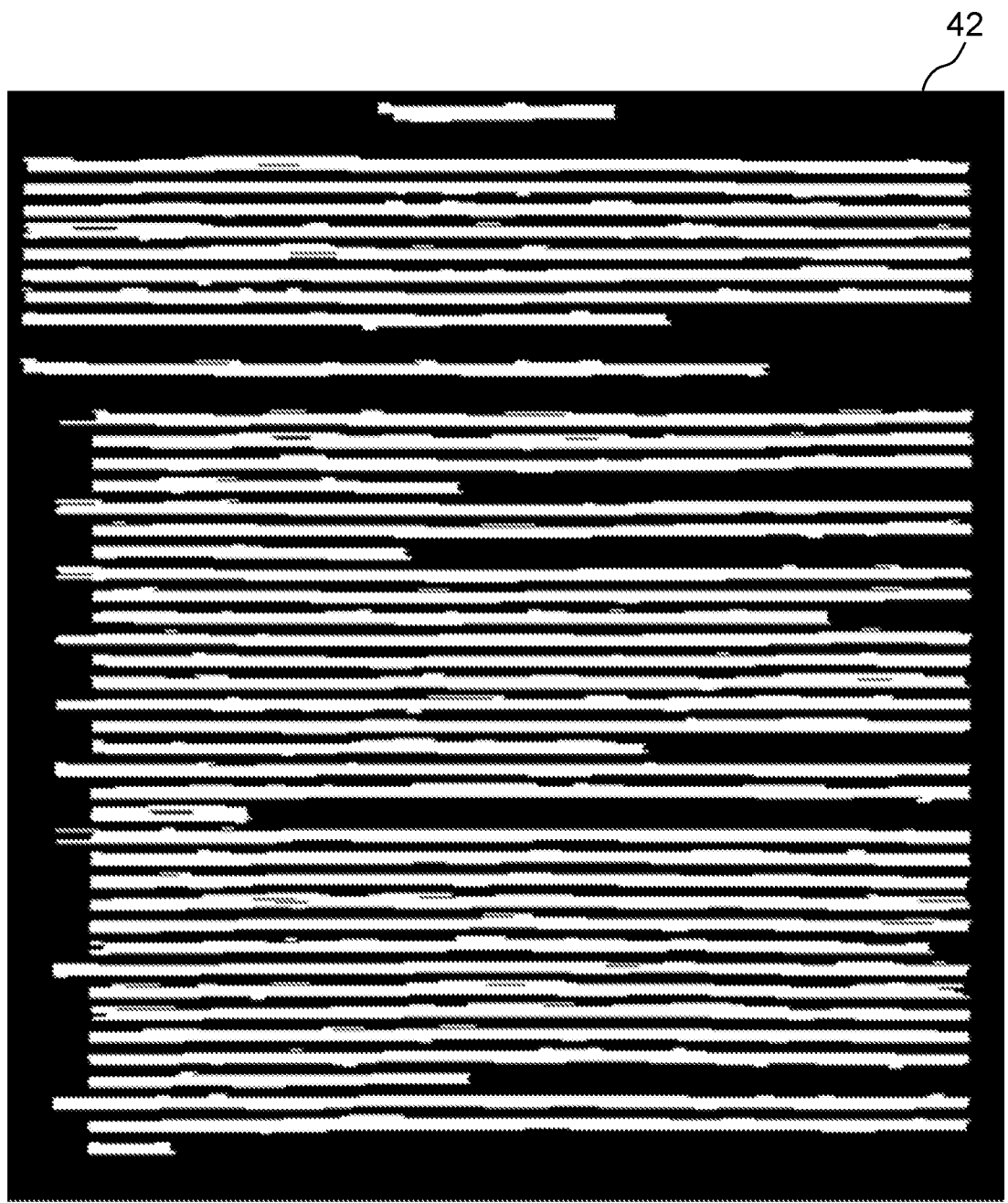
FIG. 4B is a schematic view of a first character connected image provided by some embodiments of the present disclosure.

FIG. 4A is a schematic view of an intermediate corrected image provided by some embodiments of the present disclosure. FIG. 4B is a schematic view of a first character connected image provided by some embodiments of the present disclosure.

For example, as shown in FIG. 2, in some embodiments, step S12 may include steps S120 to S123.

In the image processing method provided by the embodiment of the present disclosure, by performing local adjustment on the intermediate corrected image that is subjected to global correction, the deformation of characters (for example, text) can be reduced, and the correction effect can be improved.

For example, as shown in FIG. 2, step S120: the M character row lower boundaries corresponding to the M character rows is determined according to the intermediate corrected image.

For example, step S120 may include: performing character connection processing on the intermediate corrected image to obtain a first character connected image, wherein the first character connected image includes M first character connected areas corresponding to the M character rows; determining the M character row lower boundaries corresponding to the M character rows according to the M first character connected areas and the intermediate corrected image.

For example, as shown in FIG. 4A, in some embodiments, the intermediate corrected image 41 may be a binarized image. In the intermediate corrected image 41, the pixel corresponding to the character is represented by white, and the pixel corresponding to the background is represented by black, that is, the pixel corresponding to the character has a grayscale value of 255, and the pixel corresponding to the background has a grayscale value of 0.

For example, in step S120, when the intermediate corrected image can be a binarized image, the intermediate corrected image can be subjected to character connection processing directly based on mathematical morphology operation, so as to obtain a first character connected image including the M first character connected areas. The first character connected image 42 shown in FIG. 4B is an image obtained by performing character connection processing on the intermediate corrected image 41 shown in FIG. 4A.

It should be noted that the present disclosure does not limit that the intermediate corrected image is a binarized image. In other embodiments, the intermediate corrected image may also be a grayscale image or a color image. Under the circumstances, in step S120, character connection processing is performed on the intermediate corrected image to obtain the first character connected image, which may include: firstly, the intermediate corrected image is binarized to get a binarized image of the intermediate corrected image, and then character connection processing is performed on the binarized image of the intermediate corrected image to obtain a first character connected image.

For example, as shown in FIG. 4B, the white area is the first character connected area. For example, each first character connected area may include multiple characters in the same row, and the M character rows correspond to the M first character connected areas one-to-one, that is, each character row only corresponds to one first character connected area.

For example, the character connection processing can perform the expansion operation processing on the intermediate corrected image, thereby connecting the characters spaced apart into a straight line, so as to facilitate the subsequent linear detection.

For example, as shown in FIG. 4B, the M first character connected areas are arranged along the first direction (i.e., the Y-axis direction of the coordinate system shown in FIG. 3).

For example, in step S120, based on the M first character connected areas, the lower boundary of the area corresponding to the M first character connected areas can be determined. Based on the intermediate corrected image, the approximate range where each character row is located can be determined. Based on the approximate range where the lower boundary of area and each character row are located, the character row lower boundary corresponding to each character row can be determined.

Figure 4C:
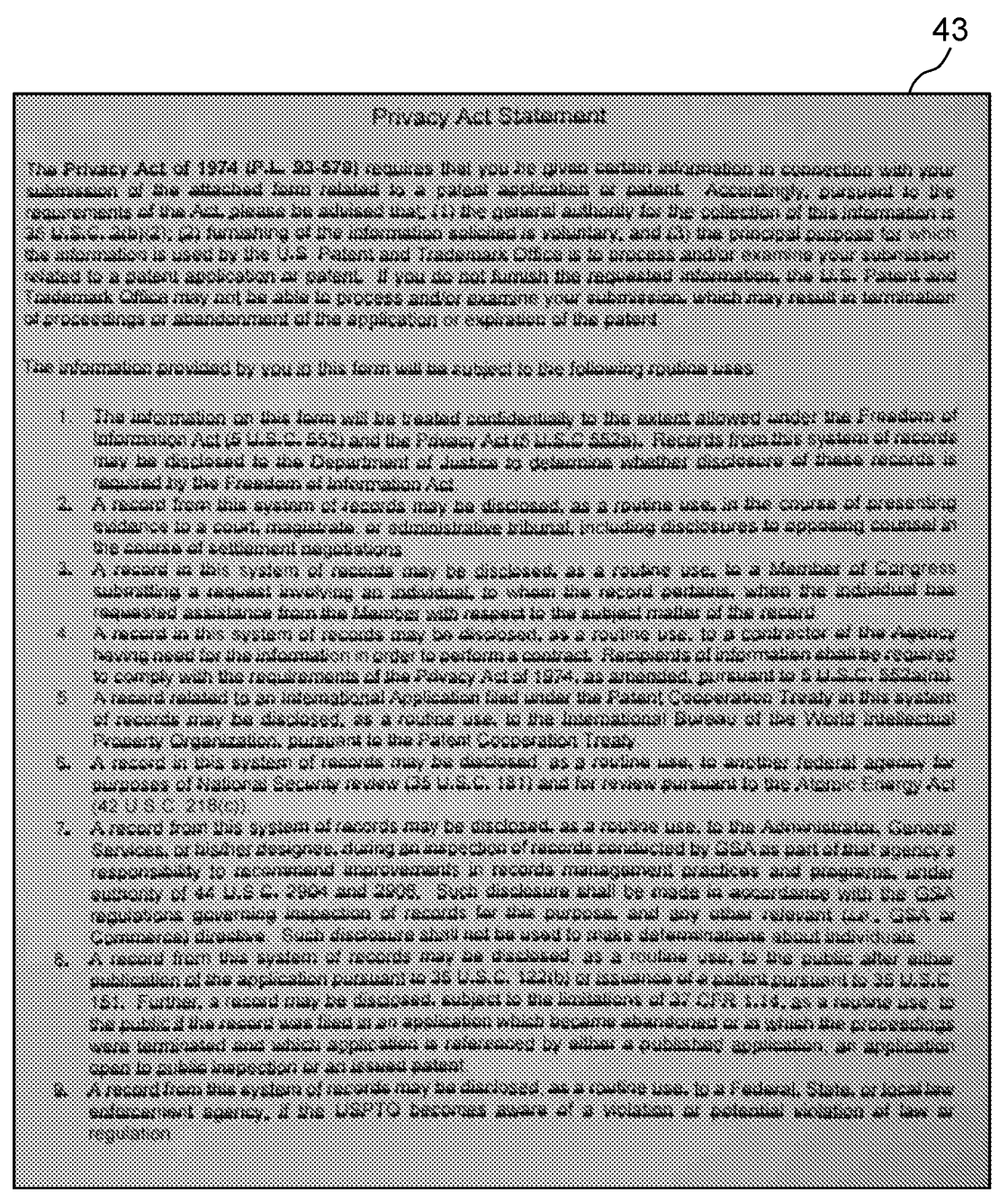
Figure 4D:
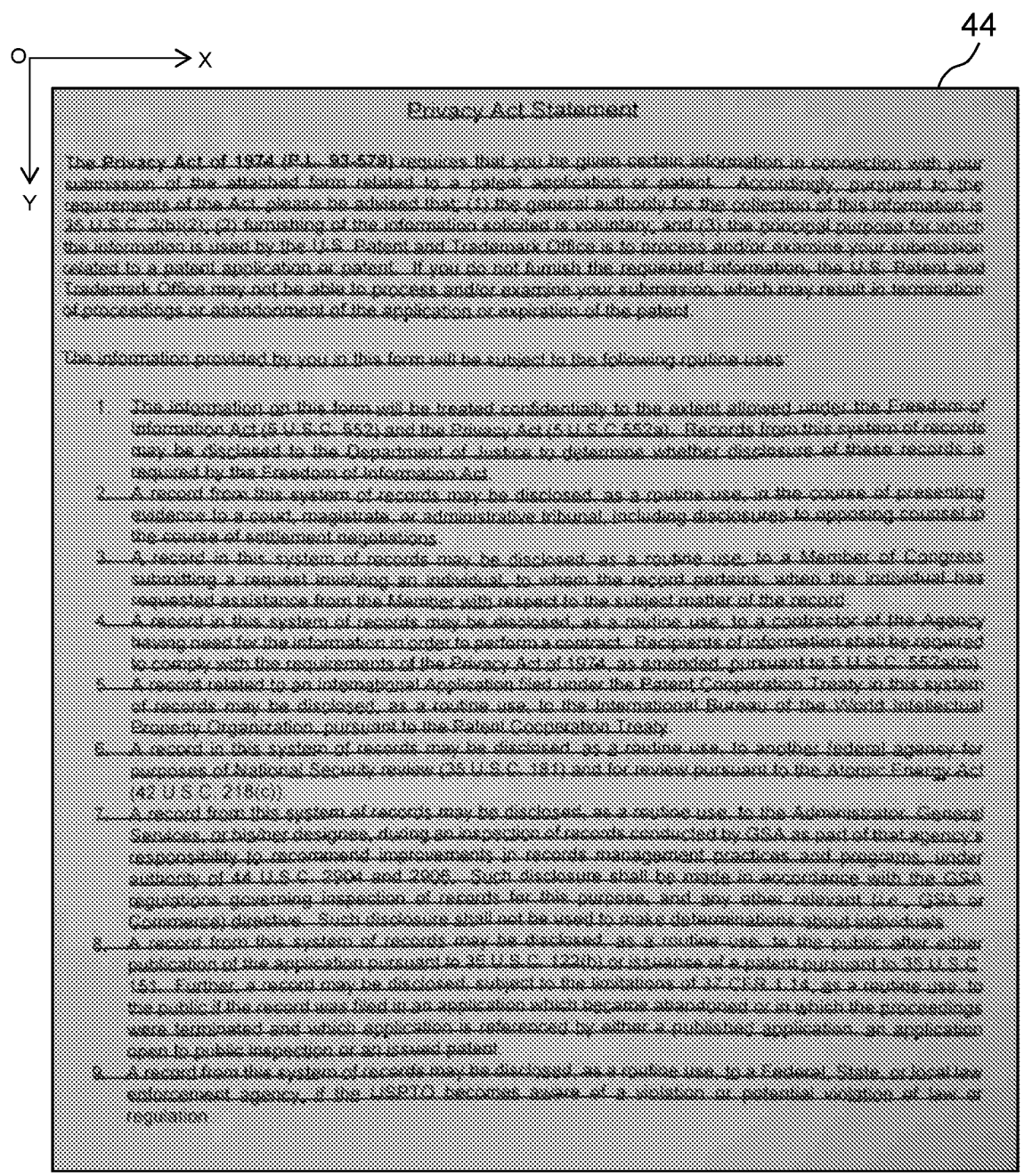
FIG. 4D is a schematic view of an intermediate corrected image including a character row lower boundary provided by some embodiments of the present disclosure.

FIG. 4C is a schematic view of an intermediate corrected image 43 including a plurality of pixels corresponding to a character row lower boundary provided by some embodiments of the present disclosure. FIG. 4D is a schematic view of an intermediate corrected image 44 including a character row lower boundary provided by some embodiments of the present disclosure.

For example, in step S120, in some embodiments, the step of determining the M character row lower boundaries corresponding to the M character rows according to the M first character connected areas and the intermediate corrected image includes: determining the M area lower boundaries corresponding to the M first character connected areas one-to-one; performing a boundary fitting process on the M character rows to obtain the M character row lower boundaries according to the M area lower boundaries and the intermediate corrected image.

For example, the M character rows include the i1-th character row, the i1-th character row corresponds to the first character connected area corresponding to the lower boundary of the i1-th area in the M area lower boundaries, and it is a positive integer less than or equal to M.

For example, the step of performing boundary fitting processing on the i1-th character row includes: obtaining the multiple pixels of each character in the i1-th character row that are closest to the lower boundary of the i1-th area; removing the noise pixels in the multiple pixels to obtain the target pixel; performing linear or quadratic fitting on the target pixel to obtain the character row lower boundary corresponding to the i1-th character row.

For example, in some embodiments, the step of performing local linear or quadratic fitting on the target pixel to obtain the character row lower boundary corresponding to the i1-th character row includes: performing local linear or quadratic fitting on the target pixel corresponding to each character in the i1-th character row respectively to obtain the fitting boundary of each character corresponding to each character in the i1-th character row; then, performing linear or quadratic fitting on the fitting boundary of each character to obtain the character row lower boundary corresponding to the i1-th character row.

For example, in other embodiments, the step of performing local linear or quadratic fitting on the target pixel to obtain the character row lower boundary corresponding to the i1-th character row includes: performing linear or quadratic fitting on the entire target pixel corresponding to each character in the i1-th character row to directly obtain the character row lower boundary corresponding to the i1-th character row.

It should be noted that linear fitting is not enough for character rows that are more curved. Linear fitting and quadratic fitting are set according to the density of the pixel point closest to the lower boundary of the corresponding area in the collected character row. If there are more pixel points closest to the lower boundary of the corresponding area in the collected character row, the quadratic fitting is performed. If there are less pixel points closest to the lower boundary of the corresponding area in the collected character row, linear fitting is performed. For example, a density threshold can be set, and if the density of the pixel points exceeds the density threshold, the quadratic fitting is performed. The fitting of each pixel point is performed by using several local pixel points nearby. For quadratic fitting, abnormality also needs to be determined. For example, if the coefficient of the quadratic term obtained through the quadratic fitting is too large, the result of the quadratic fitting is discarded and the linear fitting is performed; or the offset of the quadratic line obtained by the quadratic fitting at the interpolation point is significantly large as compared to the actual point, the result of the quadratic fitting is also discarded, and linear fitting is performed instead.

For example, as shown in FIG. 4C, the black dots and short black lines at the bottom of each character row are the pixels of each character that are closest to the lower boundary of the area. It should be noted that the pixel corresponding to the letter in some characters may not have the pixel closest to the lower boundary of the area. As shown in FIG. 4C, all the pixels corresponding to the letter P and the letter r in the character "Privacy" in the first row are not the pixels closest to the lower boundary of the area.

For example, in step S120, the lower boundary of the area of each first character connected area represents the boundary of the first character connected area away from the X-axis of the coordinate system. Each character row lower boundary of each character row represents the boundary of the character row away from the X-axis of the coordinate system.

For example, the lower boundary of the area may not be a straight line segment, but may be a line segment with a small wave shape, a zigzag shape, etc.

For example, in some embodiments, the step of acquiring a plurality of pixels of each character in the i1-th character row closest to the lower boundary of the i1-th area may include: in the Y-axis direction, acquiring multiple pixels of each character in the i1-th character row closest to the lower boundary of the i1-th area, that is, in the Y-axis direction, obtaining the pixel on the pixel column where any one of the pixels of each character in the i1-th character row is located closest to the lower boundary of the i1-th area.

For example, the step of removing the noise pixels in the multiple pixels to obtain the target pixel may include: removing the noise pixels in the multiple pixels according to a predetermined rule to obtain the target pixel. For example, if the slope of a straight line formed by two adjacent pixels in a plurality of pixels is greater than the slope threshold, then the two adjacent pixels are noise pixels. In addition, if the distance between a pixel in the plurality of pixels and the lower boundary of the i1-th area is greater than the distance threshold, the pixel is also a noise pixel. For example, the predetermined rule may include a slope threshold and a distance threshold, etc., and the slope threshold and the distance threshold may be set by the user according to actual conditions.

It should be noted that "two adjacent pixels" does not mean that the two pixels are directly adjacent to each other physically, but that the two adjacent pixels are located in different pixel columns. For example, if two adjacent pixels are respectively located in the a-th pixel column and the a+b-th pixel column, a is a positive integer and b is a positive integer. For example, when b is 1, the two adjacent pixels are located in two adjacent pixel columns. Under the circumstances, the two adjacent pixels are adjacent to each other physically. When b is not 1, the two adjacent pixels are not adjacent to each other physically. The two adjacent pixels may not be in contact with each other physically, or they may be in contact with each other. This disclosure provides no limitation thereto. For example, one of the two adjacent pixels is located in the first row of the a-th pixel column, and the other pixel of the two adjacent pixels is located in the 5-th row of the a+b-th pixel column. Under the circumstances, the two adjacent pixels are not in contact with each other physically. If b is 1, and one of the two adjacent pixels is located in, for example, the first row of the a-th pixel column, and the other pixel of the two adjacent pixels is located in, for example, the first row of the a+b-th pixel column, under the circumstances, the two adjacent pixels are in contact with each other physically.

For example, as shown in FIG. 4D, the line below each character row is the character row lower boundary corresponding to the character row obtained by fitting. The character row lower boundary may not be a straight line segment, but may be a line segment having a small wave shape, a zigzag shape, etc. It should be noted that, in order to clearly show the character row lower boundary, the intermediate corrected image 44 shown in FIG. 4D is not embodied in the form of a binarized image.

For example, FIG. 4D shows the character row lower boundary of all character rows in the intermediate corrected image 44. The character row lower boundary and the character row corresponding to the character row lower boundary may not overlap or partially overlap. For example, the character row lower boundary corresponding to the character row (for example, the first row) where the character "Privacy" is located overlaps some pixels in all pixels representing letter "y" in the character "Privacy".

For example, lower boundaries of two character rows corresponding to two adjacent character rows can be separated from each other by a certain distance. It should be noted that, among lower boundaries of multiple character rows, there may be lower boundaries of character rows that are parallel to each other. The present disclosure provides no limitation to the parameters of the character row lower boundary, and the length, slope and other parameters of the character row lower boundary can be determined based on the character row corresponding to the character row lower boundary.

Figure 4E:
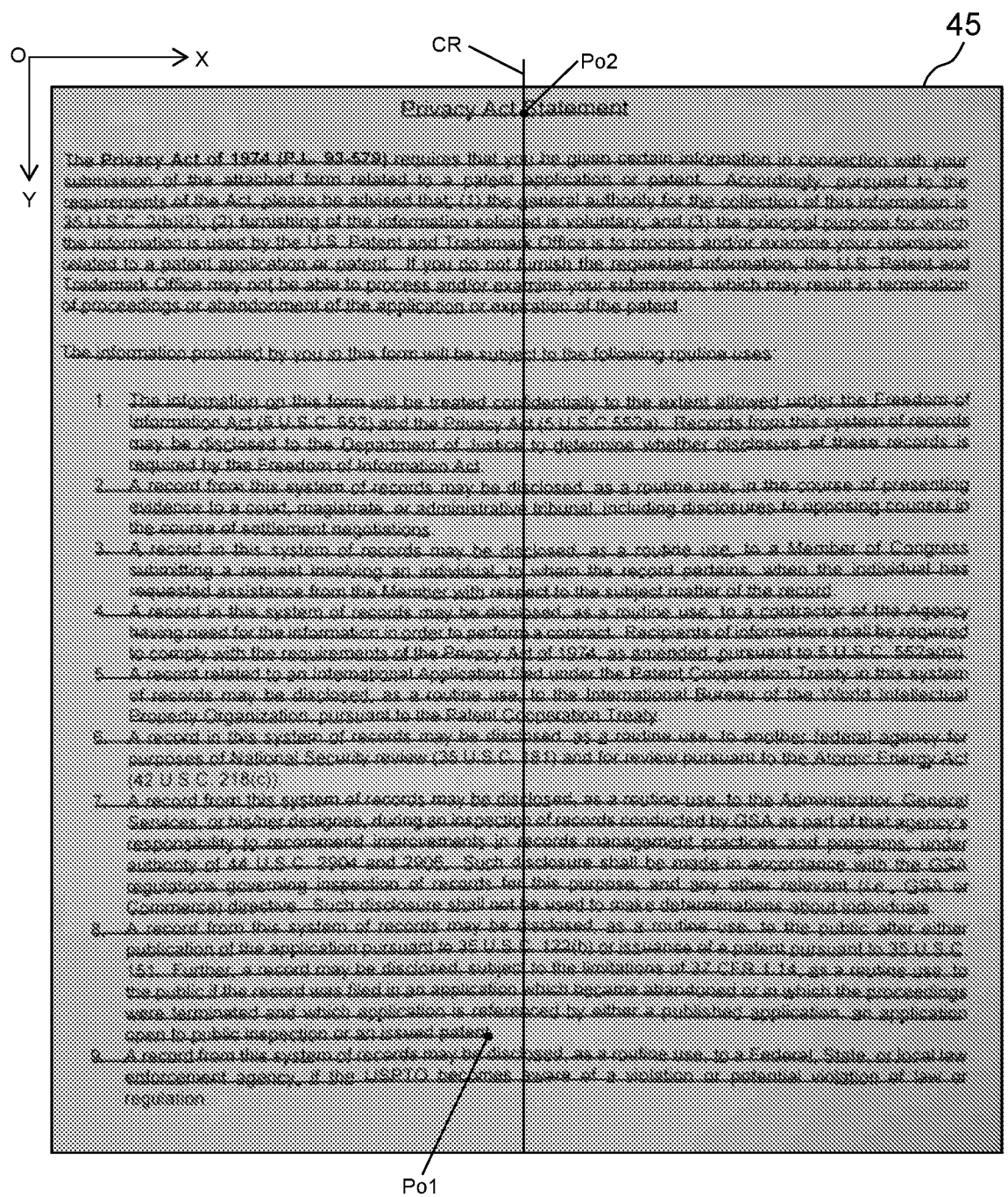
FIG. 4E is a schematic view of an intermediate corrected image including a local adjustment reference line provided by some embodiments of the present disclosure.

FIG. 4E is a schematic view of an intermediate corrected image including a local adjustment reference line provided by some embodiments of the present disclosure.

For example, as shown in FIG. 2, in step S121: Based on the intermediate corrected image and the M character row lower boundaries, the local adjustment reference line and the M retention coefficient groups are determined, wherein each of the M retention coefficient groups includes multiple retention coefficients.

For example, in step S121, the step of determining the local adjustment reference line includes: for the i4-th character row in the M character rows, determining the local character row area corresponding to the i4-th character row, wherein i4 is a positive integer less than or equal to M; for each pixel in the local character row area, obtaining the point on the character row lower boundary corresponding to the i4-th character row closest to the pixel as the reference pixel; determining the attenuation value corresponding to the pixel according to the distance between the pixel and the reference pixel; performing the above operations on each pixel in the local character row area corresponding to the i4-th character row to determine the retention coefficients corresponding to all pixels in the local character row area corresponding to the i4-th character row, thereby determining the retention coefficient group corresponding to the local character row area corresponding to the i4-th character row. For example, the M retention coefficient groups include the retention coefficient groups corresponding to local character row area corresponding to the i4-th character row. The above operations are performed on the M character rows respectively to determine the M retention coefficient groups.

It should be noted that the local character row area is determined according to the row height of its corresponding character row, and a corresponding row height will be calculated for each character row. This row height is obtained by calculating the average of the heights of the character connected areas of the character rows.

It should be noted that the shape of the local character row area is an irregular shape. In the arrangement direction of the character rows, the shape of the upper boundary of the local character row area is the same as the shape of the lower boundary of the local character row area, and the upper boundary and the lower boundary of the local character row area are parallel to each other. The local character row area will contain a marginal area outside certain character rows. The local character row area of the character row can be set as an area that is three rows away from the character row in the upper-lower direction, that is, the height of the local character row area of the character row is 6 times height. For example, in the arrangement direction of character rows, the character row lower boundaries corresponding to character rows can be extended up to a distance of 3 rows to determine the upper boundary of the local character row area corresponding to the character row, and the character row lower boundaries corresponding to character rows can be extended down to a distance of 3 rows to determine the lower boundary of the local character row area corresponding to the character row, thereby determining the local character row area corresponding to the character row.

For example, the retention coefficient group corresponding to the local character row area corresponding to the i4-th character row includes the retention coefficient corresponding to all pixels in the local character row area corresponding to the i4-th character row.

For example, the pixel and the reference pixel may be located in the same pixel column, or may be located in different pixel columns, as long as it is ensured that the distance between the pixel and the reference pixel is smaller than the distance between the pixel and any of the remaining pixel on the lower boundary of the corresponding character row.

For example, the value range of the retention coefficient in each retention coefficient group is 0~1.

For example, retention coefficient groups can be embodied in the form of a matrix. For example, the size of the matrix corresponding to the retention coefficient groups can be larger than the size of the local character row area (pixel matrix) corresponding to the character row corresponding to the retention coefficient groups. Each pixel in the local character row area corresponds to a retention coefficient in the retention coefficient group.

For example, the range of attenuation value is 0~1. The attenuation value of a pixel is proportional to the distance between the pixel and the corresponding character row lower boundary, and the attenuation value is preset according to actual conditions. In general, the closer the pixel in the local character row area is to the corresponding character row lower boundary, that is, the smaller the distance between the pixel and the reference pixel, the smaller the attenuation value corresponding to the pixel (that is, the closer the attenuation value is to 0); the farther the pixel in the local character row area is from the corresponding character row lower boundary, that is, the greater the distance between the pixel and the reference pixel, and the greater the attenuation value corresponding to the pixel (that is, the closer the attenuation value is to 1). Generally, the area that is 3 to 5 rows away is completely attenuated, that is, the attenuation value is 1 under the circumstances. In specific implementation, each attenuation value is also related to other factors, including character row height, the ratio of character row height to length and width of input image, the area where the characters are located, the ratio of detected reference character offset to the character row height and so on.

For example, retention coefficient=1-attenuation value.

It should be noted that the character row height is a constant and is related to the font size of the characters in the input image and the spacing between the character rows.

For example, as shown in FIG. 2, in step S122: The M local adjustment offset groups corresponding to the M character rows are determined according to the M character row lower boundaries, the local adjustment reference line and the M retention coefficient groups, wherein each local adjustment offset group in the M local adjustment offset groups comprises multiple local adjustment offsets.

For example, in some embodiments, step S122 includes: determining the M local adjustment reference points corresponding to the M character row lower boundaries according to the local adjustment reference line; for the i2-th character row lower boundary in the M character row lower boundaries, determining the local adjustment reference point corresponding to the i2-th character row lower boundary in the M local adjustment reference points, wherein i2 is a positive integer less than or equal to M; determining the i2-th character row corresponding to the i2-th character row lower boundary in the M character rows; determining the local character row area corresponding to the i2-th character row according to the height of the character rows and the i2-th character row; determining the multiple reference character offsets corresponding to the i2-th character row lower boundary according to the i2-th character row lower boundary and the local adjustment reference point corresponding to the i2-th character row lower boundary; in response to that the local character row area corresponding to the i2-th character row does not overlap the local character row area corresponding to any one of remaining character row in the M character rows, determining the local adjustment offset corresponding to each pixel in the local character row area corresponding to the i2-th character row according to the multiple reference character offsets corresponding to the i2-th character row and the retention coefficient group corresponding to the local character row area corresponding to the i2-th character row in the M retention coefficient groups, that is, determining the local adjustment offset group corresponding to the i2-th character row. The above operations are performed on the M character rows, thereby determining the M local adjustment offset groups corresponding to the M character rows one-to-one.

It should be noted that the local character row area includes the corresponding character row lower boundary, and each pixel in the local character row area includes the pixel on the corresponding character row lower boundary, that is, the local adjustment offset corresponding to each pixel in the local character row area includes the reference character offset of pixels on the character row lower boundary.

For example, according to the height of the character rows, the size of the local character row area to be considered for each character row can be determined. For example, the higher the character rows are, the larger the local character row area that needs to be considered.

For example, the multiple reference character offsets corresponding to the i2-th character row lower boundary correspond to all pixels on the i2-th character row lower boundary one-to-one, that is to say, each pixel on the i2-th character row lower boundary corresponds to one reference character offset.

It should be noted that in the embodiments of the present disclosure, the "reference character offset" of a certain pixel on the character row lower boundary can represent the difference between the Y-axis coordinate value of a certain pixel in the coordinate system OXY and the Y-axis coordinate value of the local adjustment reference point corresponding to the character row lower boundary in the coordinate system OXY.

For example, the local adjustment offset of a pixel may indicate the offset of the pixel in the Y-axis direction in the coordinate system OXY.

For example, in step S122, the step of determining the local adjustment offset corresponding to each pixel in the local character row area corresponding to the i2-th character row according to the multiple reference character offsets corresponding to the i2-th character row and the retention coefficient group corresponding to the local character row area corresponding to the i2-th character row in the M retention coefficient groups includes: for any pixel in the local character row area corresponding to the i2-th character row, obtaining the reference pixel corresponding to any pixel; determining the reference character offset corresponding to the reference pixel; obtaining the retention coefficient corresponding to said any pixel; multiplying the reference character offset corresponding to the reference pixel by the retention coefficient corresponding to said any pixel to determine the local adjustment offset of said any pixel.

For example, the local adjustment offset of the pixel may be the product of the reference character offset of the reference pixel corresponding to the pixel and the retention coefficient corresponding to the pixel. The final effect is that the closer the distance between the pixel and the character row lower boundary corresponding to the character row to which the pixel belongs, the larger the local adjustment offset corresponding to the pixel is obtained (that is, much closer to the reference character offset of the reference pixel corresponding to the pixel). The farther the distance between the pixel and the character row lower boundary corresponding to the character row to which the pixel belongs, the smaller the local adjustment offset corresponding to the pixel is obtained. When the distance between the pixel and the character row lower boundary corresponding to the character row corresponding to the pixel exceeds a certain threshold, the local adjustment offset corresponding to the pixel is zero.

The purpose of generating the local adjustment offset of each pixel in the local character row area corresponding to the character row is: to make the target corrected image generated after the local adjustment smooth locally, thereby achieving the effect of local adjustment, and the local adjustment will not cause the image to be malformed.

For example, the M local adjustment offset groups include the local adjustment offset group corresponding to the i2-th character row, and the local adjustment offset group corresponding to the i2-th character row includes the local adjustment offset corresponding to each pixel in the local character row area corresponding to the i2-th character row.

For example, in step S122, the step of determining the M local adjustment reference points corresponding to the M character row lower boundaries according to the local adjustment reference line includes: for each character row lower boundary in the M character row lower boundaries, under the condition that there is an intersection between the character row lower boundaries and the local adjustment reference line, determining the local adjustment reference point corresponding to the character row lower boundary as the intersection; under the condition that there is no intersection between the character row lower boundary and the local adjustment reference line, determining the local adjustment reference point corresponding to the character row lower boundary as the point on the character row lower boundary closest to the local adjustment reference line.

For example, in the intermediate corrected image 45, some character rows are shorter, as shown in FIG. 4E, the straight line CR represents the local adjustment reference line. Some character rows (the character row includes the character "open", the character "to", the character "public", the character "inspection", the character "or", the character "an", the character "issued", the character "patent") are shorter, and under the condition that there is no intersection between the character row lower boundary corresponding to the character row and the local adjustment reference line, then the local adjustment reference point corresponding to the character row lower boundary corresponding to the character row is the point on the character row lower boundary closest to the local adjustment reference line CR, such as the point Po1 shown in FIG. 4E. Under the condition that there is an intersection between the character row lower boundary corresponding to another character row (the character row includes the character "Privacy", the character "Act", and the character "Statement") and the local adjustment reference line, for example, point Po2 as shown in FIG. 4E, then the local adjustment reference point corresponding to the character row lower boundary corresponding to the second character row is the intersection Po2 between the character row lower boundary and the local adjustment reference line CR.

FIG. 4F is a schematic view of an overlapped area provided by some embodiments of the present disclosure.

For example, in some embodiments, for two adjacent character rows, when the two local character row areas corresponding to the two character rows overlap each other, since the overlapped area of the two local character row areas belongs to two local character row areas, the local adjustment offset of the pixel in the overlapped area is jointly determined by these two character rows. It will suffice as long as the change of the local adjustment offset is smooth when transitioning from one character row to another character row. For example, the local adjustment offset of the pixel in the overlapped area is determined by the reference character offset corresponding to the two character rows. For example, a boundary threshold can be set (generally, the boundary threshold can be set to 3 rows high).

For example, in an example, as shown in FIG. 4F, for any pixel column in the overlapped area OV of two adjacent local character row areas Tet1 and Tet2, two pixels P01 and P02 in the pixel column located on the lower boundaries Cb1 and C2 of the character rows corresponding to the two adjacent local character row areas Tet1 and Tet2 are determined.

If the distance between the two pixels P01 and P02 is less than or equal to the boundary threshold, in this case, the middle local area (middle local pixel) between the two pixels P01 and P02 not only belongs to the lower (upper) local character row area but also belongs to the upper (lower) local character row area. Under the circumstances, there is no non-overlapped area (pixel) between the two pixels P01 and P02, and therefore the middle local pixel between the two pixels P01 and P02 can be obtained by performing linear interpolation on the local adjustment offset (i.e., reference character offset) corresponding to the two pixels P01 and P02.

As shown in FIG. 4F, if the distance between the two pixels P01 and P02 is greater than the boundary threshold, then for any middle local pixel P1 between the two pixels P01 and P02, the first distance l1 and the second distance l2 between said any middle local pixel P1 and the upper and lower boundaries of the overlapped area Ov are determined. Based on the position of said any middle local pixel P1 in the first local character row area Tet1 in the two adjacent local character row areas Tet1 and Tet2, the reference pixel in the first local character row area Tet1 corresponding to said any middle local pixel P1 is determined (for example, the reference pixel is located in the character row lower boundary Cb1 corresponding to the first local character row area Tet1), and the reference character offset corresponding to the reference pixel corresponding to said any middle local pixel P1 in the first local character row area Tet1 is determined, and the first retention coefficient corresponding to said any middle local pixel P1 is obtained. Based on the first distance l1, the second distance l2, the reference character offset corresponding to the reference pixel corresponding to said any middle local pixel P1 in the first local character row area Tet1 and the first retention coefficient, the first local adjustment offset of said any middle local pixel P1 is determined. Based on the position of said any middle local pixel P1 in the second local character row area Tet2 in the two adjacent local character row areas Tet1 and Tet2, the reference pixel corresponding to said any middle local pixel P1 in the second local character row area Tet2 is determined (for example, the reference pixel is located in the character row lower boundary Cb2 corresponding to the second local character row area Tet2). The reference character offset corresponding to the reference pixel corresponding to said any middle local pixel P1 in the second local character row area Tet2 is determined. The second retention coefficient corresponding to said any middle local pixel P1 is obtained. Based on the first distance l1, the second distance l2, the reference character offset corresponding to the reference pixel corresponding to said any middle local pixel P1 in the second local character row area Tet2 and the second retention coefficient corresponding to said any middle local pixel P1, the second local adjustment offset of said any middle local pixel P1 is determined. Then, the final local adjustment offset of said any middle local pixel P1 is determined according to the first local adjustment offset and the second local adjustment offset. For example, the final local adjustment offset can be calculated by using the following formula:

$$dy = \frac{l2}{l1+l2} * dy1 * d1 + \frac{l1}{l1+l2} * dy2 * d2$$

In the formula, dy represents the final local adjustment offset of said any middle local pixel P1, $$\frac{l2}{l1+l2} * dy1 * d1$$

represents the first local adjustment offset, $$\frac{l1}{l1+l2} * dy2 * d2$$

represents the second local adjustment offset, l1 represents the first distance, l2 represents the second distance, and d1 represents the first retention coefficient corresponding to said any middle local pixel P1, d2 represents the second retention coefficient corresponding to said any middle local pixel P1, dy1 represents the reference character offset corresponding to the reference pixel corresponding to said any middle local pixel P1 in the first local character row area Tet1, and dy2 represent the reference character offset corresponding to the reference pixel corresponding to said any middle local pixel P1 in the second local character row area Tet2. It should be noted that the first distance l1 can represent the distance between said any middle local pixel P1 and the upper boundary of the overlapped area Ov, and the second distance l2 can represent the lower boundary between said any middle local pixel P1 and the overlapped area Ov.

For example, step S122 further includes: for the i3-th character row lower boundary in the M character row lower boundaries, determining the local adjustment reference point corresponding to the i3-th character row lower boundary in the M local adjustment reference points, wherein i3 is a positive integer less than or equal to M, i2 and i3 are not equal to each other; determining the i3-th character row corresponding to the i3-th character row lower boundary in the M character rows; determining the local character row area corresponding to the i3-th character row according to the height of the character row and the i3-th character row; determining the multiple reference character offsets corresponding to the i3-th character row according to the i3-th character row lower boundary and the local adjustment reference point corresponding to the i3-th character row lower boundary; in response to that the local character row area corresponding to the i2-th character row partially overlaps the local character row area corresponding to the i3-th character row: for the overlapped area between the local character row area corresponding to the i2-th character row and the local character row area corresponding to the i3-th character row, determining the local adjustment offset of each pixel in the overlapped area according to the multiple reference character offsets corresponding to the i2-th character row and the multiple reference character offsets corresponding to the i3-th character row, for each pixel in the non-overlapped area outside the overlapped area in the local character area corresponding to the i2-th character row, determining the local adjustment offset corresponding to each pixel in the non-overlapped area of the local character row area corresponding to the i2-th character row according to the multiple reference character offsets corresponding to the i2-th character row and the retention coefficient group corresponding to the local character row area corresponding to the i2-th character row in the M retention coefficient groups; for each pixel in the non-overlapped area outside the overlapped area in the local character row area corresponding to the i3-th character row, determining the local adjustment offset corresponding to each pixel in the non-overlapped area in the local character row area corresponding to the i3-th character row according to the multiple reference character offsets corresponding to the i3-th character row and the retention coefficient groups in the M retention coefficient groups corresponding to the local character row area corresponding to the i3-th character row.

For example, the M local adjustment offset groups and the local adjustment offset group corresponding to the i2-th character row include the local adjustment offset of each pixel in the non-overlapped area of the local character row area corresponding to the i2-th character row and the local adjustment offset of each pixel in the overlapped area. The local adjustment offset group in the M local adjustment offset groups corresponding to the i3-th character row includes the local adjustment offset of each pixel in the non-overlapped area of the local character row area corresponding to the i3-th character row and the local adjustment offset of each pixel in the overlapped area.

For example, in some embodiments, the i2-th character row and the i3-th character row are two adjacent character rows, for example, i2=1+i3, or i3=1+i2.

It should be noted that, in some embodiments, the local adjustment offset of each pixel in the overlapped area may be the same. Since the overlapped area generally corresponds to the background part of the input image, that is, excluding characters, the identical local adjustment offset of each pixel in the overlapped area will not affect the effect of local adjustment performed on the characters.

For example, as shown in FIG. 2, step S123 includes: performing local adjustment on the M character rows in the intermediate corrected image according to the M local adjustment offset groups to obtain the target corrected image.

For example, in some embodiments, step S123 includes: determining the local character row area corresponding to M character rows in the intermediate corrected image; and performing linear local adjustment on the pixels in the local character row area corresponding to the M character rows respectively according to the M local adjustment offset groups to obtain the target corrected image.

It should be noted that the number and types of characters in the input image, the characters in the intermediate corrected image, and the characters in the target corrected image are the same. The difference between them is: there may be differences in the absolute positions of the characters in the input image, the characters in the intermediate corrected image, and the characters in the target corrected image. However, the relative position of each character can remain unchanged, that is, two characters that are adjacent to each other in the input image are still adjacent to each other in the intermediate corrected image and the target corrected image.

For example, global correction is used to correct the overall shape of all characters in the input image. In some embodiments, global correction can be implemented by using algorithms in opencv based on the concept of Leptonica (Leptonica is an open source image processing and image analysis library). In other embodiments, global correction can also be implemented through machine learning (for example, neural network).

Figure 5A:
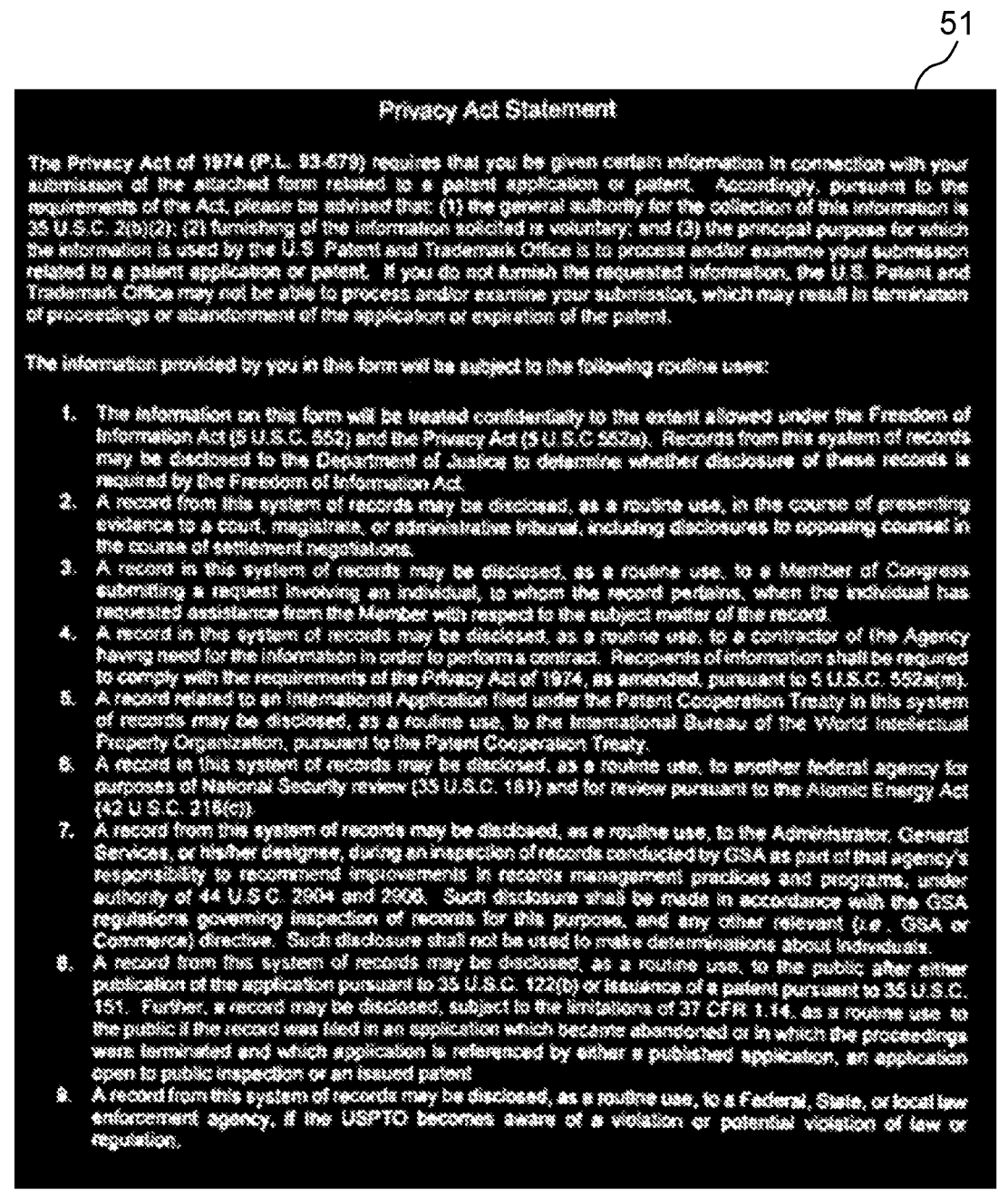
Figure 5B:
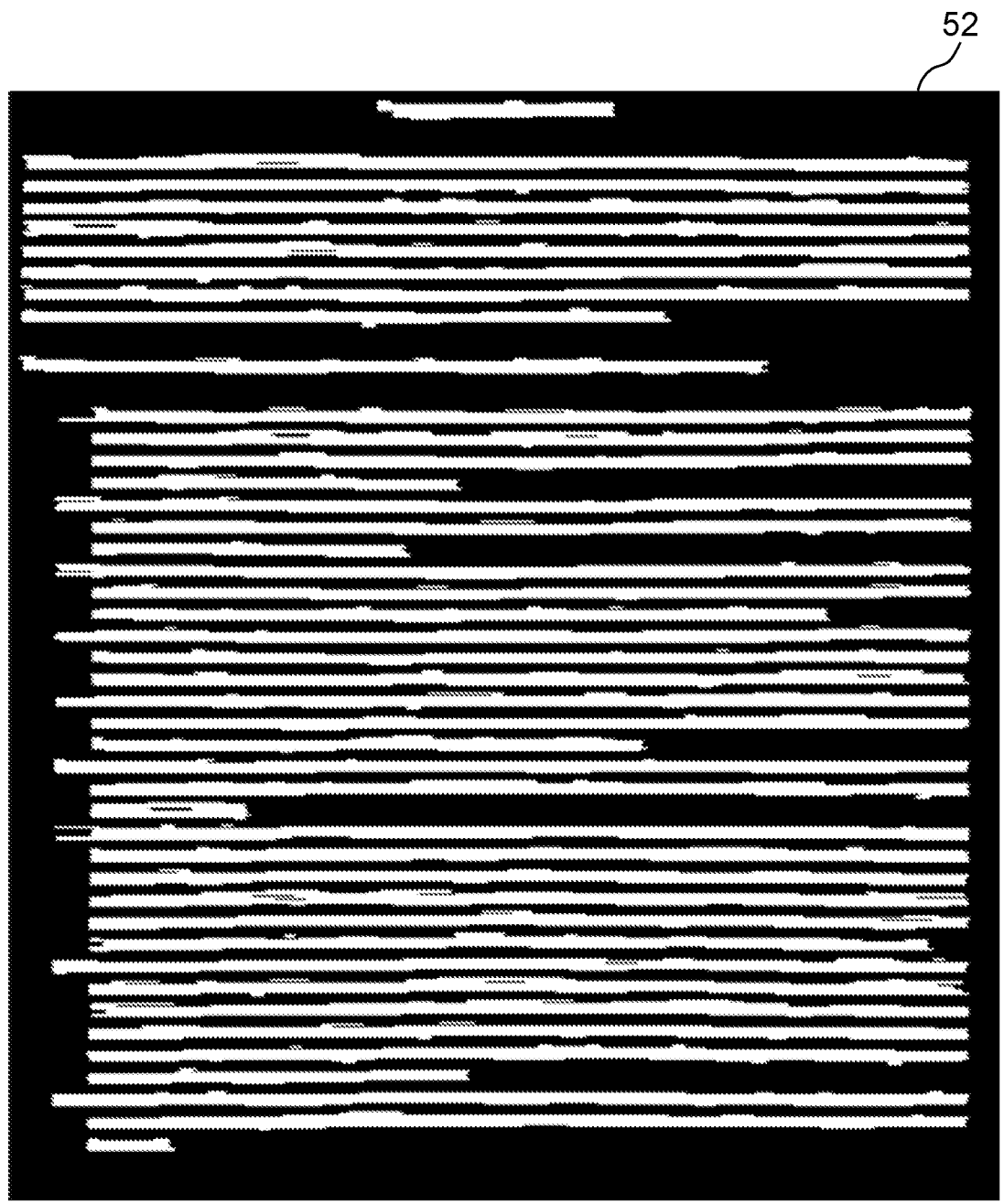
FIG. 5B is a schematic view of a second character connected image provided by some embodiments of the present disclosure.
Figure 6A:
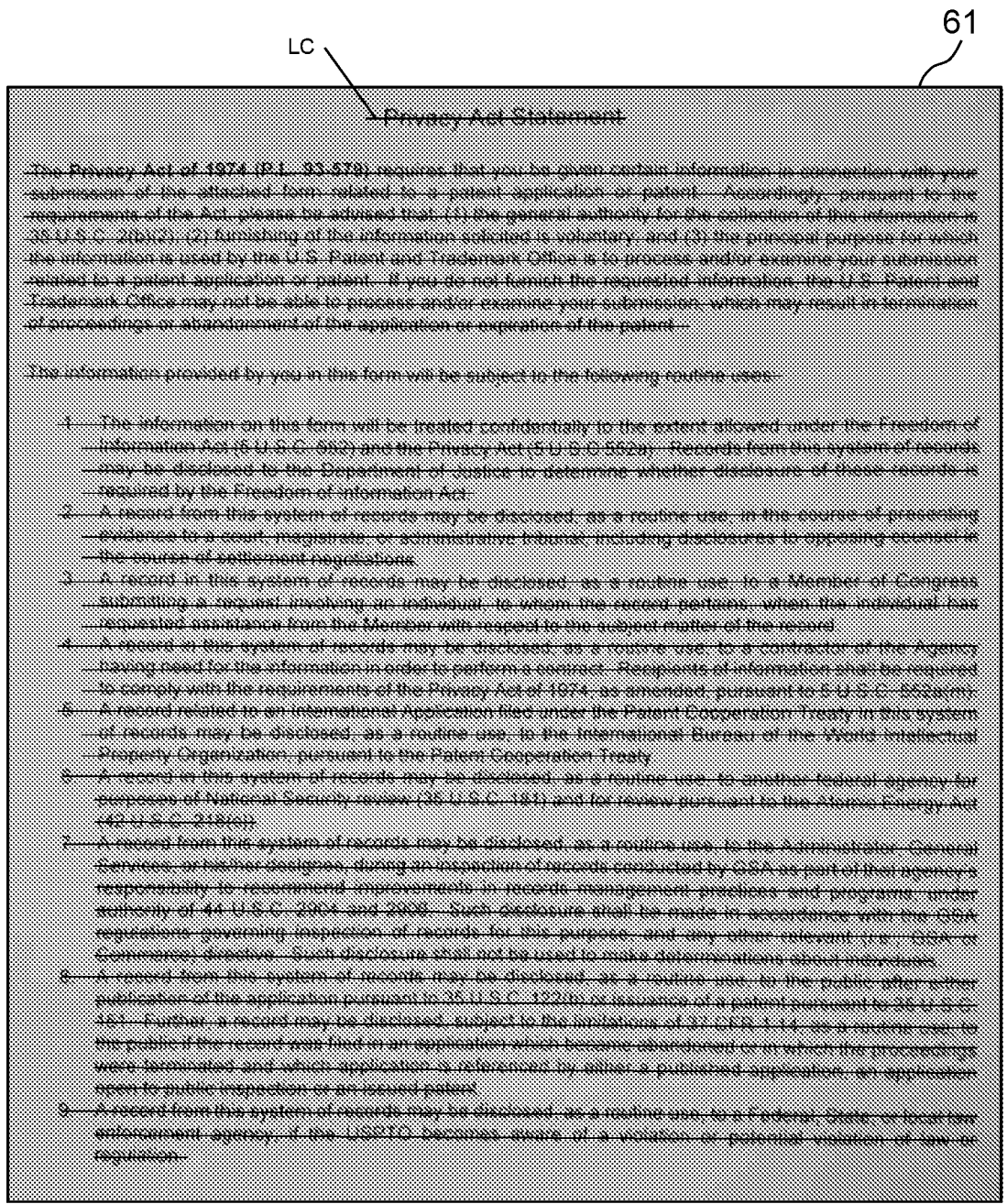
FIG. 6A is a schematic view of an input image showing M middle lines provided by some embodiments of the present disclosure.
Figure 6B:
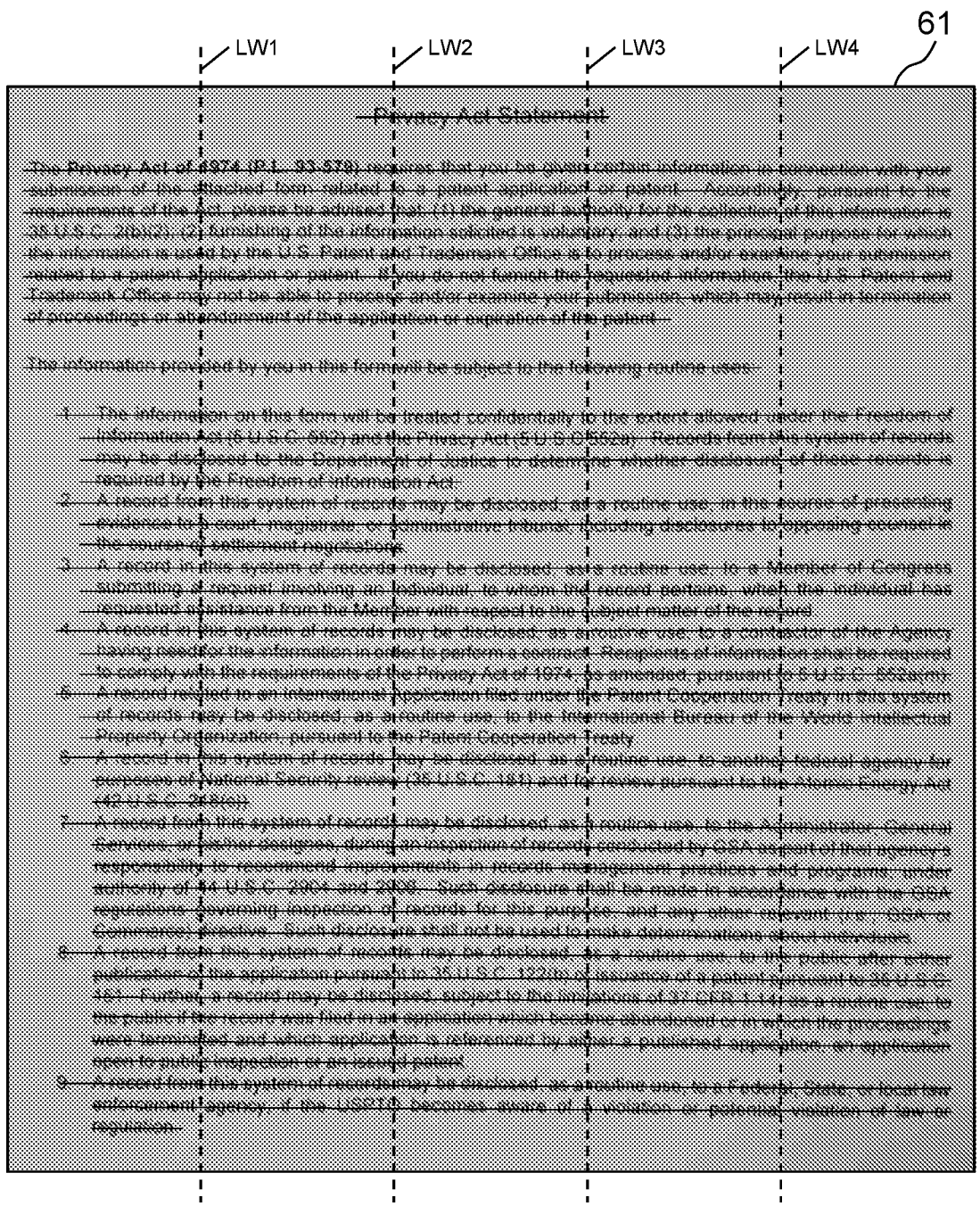
FIG. 6B is a schematic view of an input image showing W first division lines provided by some embodiments of the present disclosure.
Figure 6C:
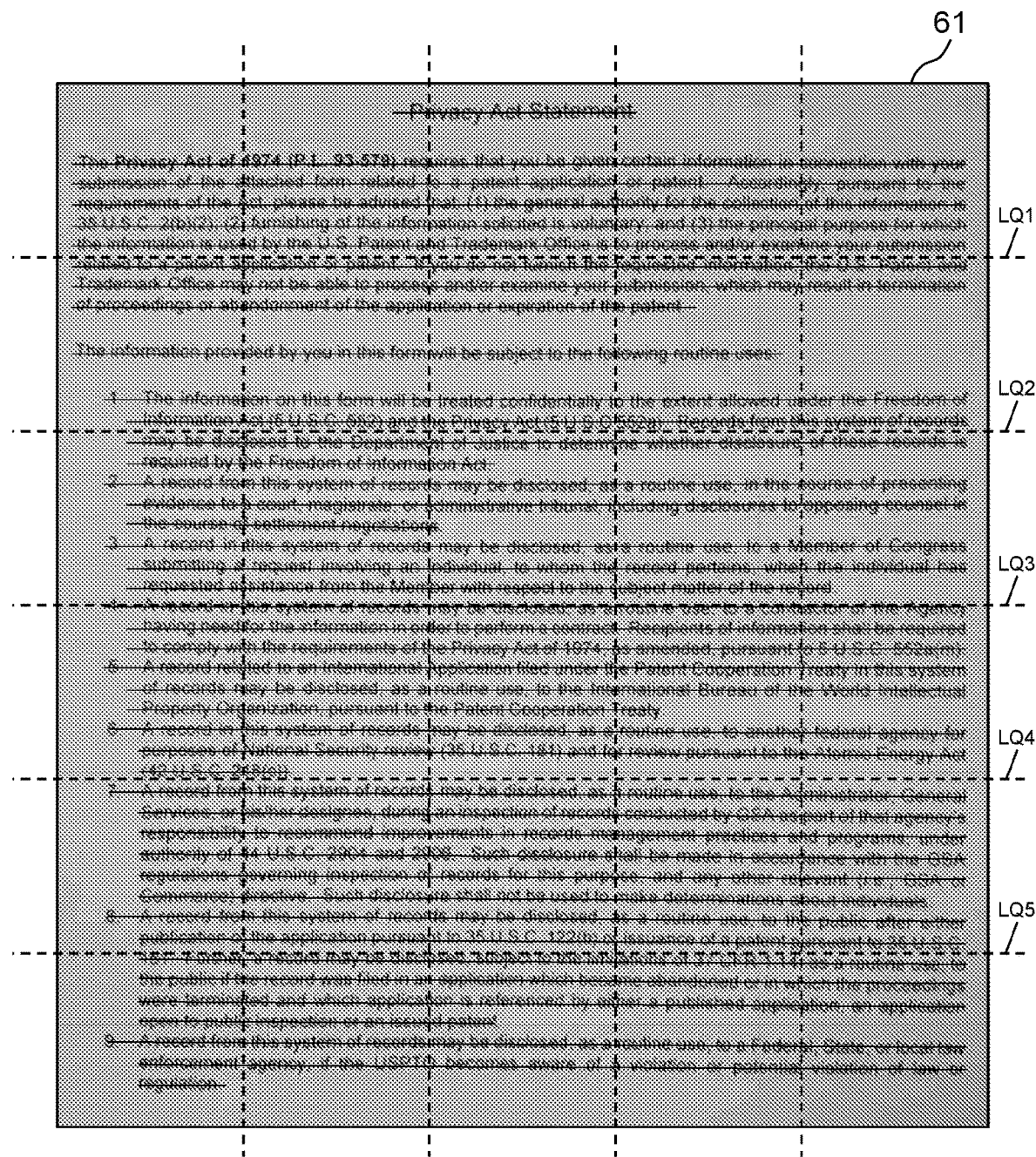
FIG. 6C is a schematic view of an input image showing Q second division lines provided by some embodiments of the present disclosure.

FIG. 5A is a schematic view of a binarized image of an input image provided by some embodiments of the present disclosure. FIG. 5B is a schematic view of a second character connected image provided by some embodiments of the present disclosure. FIG. 6A is a schematic view of an input image 61 showing M middle lines provided by some embodiments of the present disclosure. FIG. 6B is a schematic view of an input image 62 showing W first division lines provided by some embodiments of the present disclosure. FIG. 6C is a schematic view of an input image 63 showing Q second division lines provided by some embodiments of the present disclosure.

For example, in some embodiments, step S11 may include: performing binarization processing on the input image to obtain a binarized image of the input image; performing character connection processing on the binarized image to obtain the second character connected image, wherein the second character connected image includes M second character connected areas corresponding to M character rows; obtaining M middle lines corresponding to the M second character connected areas one-to-one, wherein the M second character connected areas are arranged along the first direction; setting W first division lines; obtaining multiple first intersections between the M middle lines and W first division lines; performing quadratic fitting based on the multiple first intersections to obtain W quadratic functions corresponding to the W first division lines one-to-one; setting Q second division lines; obtaining multiple second intersections between the W first division lines and the Q second division lines; calculating the global adjustment offset of the multiple second intersections based on the W quadratic functions; performing global correction processing on the binarized image according to the global adjustment offset of the multiple second intersections, so as to get the intermediate corrected image.

For example, the binarization process is to set the gray value of the pixel on the input image to 0 or 255, that is, to present the entire input image with a clear black and white effect. In step S120, the binarization process is reversed binarization processing, as shown in FIG. 5A, in the binarized image 51 of the input image, the gray value of the pixel corresponding to the character is 255, and the gray value of the pixel corresponding to the background is 0, that is, the character is white, and the background is black.

For example, the method of binarization may include threshold method, bimodal method, P-parameter method, big law (OTSU method), maximum entropy method, iterative algorithm, and so on.

For example, the method of performing character connection processing on a binarized image is the same as the method of performing character connection processing on an intermediate corrected image described above, and no further description will be incorporated herein. For example, the second character connected image 52 shown in FIG. 5B is an image obtained by performing character connection processing on the input image shown in FIG. 5A.

For example, in step S11, the step of performing quadratic fitting based on a plurality of first intersections to obtain W quadratic functions corresponding to the W first division lines one-to-one includes: determining the coordinate system based on the input image; determining the coordinate values of the multiple character center points corresponding to the multiple first intersections in the coordinate system; calculating the global adjustment offset of the multiple first intersections based on the multiple character center points; performing quadratic fitting on the global adjustment offset of the multiple first intersections to obtain W quadratic functions corresponding to the W first division lines one-to-one.

For example, the coordinate system may be the coordinate system OXY shown in FIG. 3.

For example, in some embodiments, W may be 30, and Q may also be 30.

For example, the W first division lines extend in the first direction, the Q second division lines extend in the second direction, and the first direction and the second direction are perpendicular to each other. For example, the coordinate system includes an X-axis and a Y-axis, the first direction may be parallel to the X-axis of the coordinate system, and the second direction may be parallel to the Y-axis of the coordinate system. For example, as shown in FIG. 6A, LC represents the middle line corresponding to the second character connected area. FIG. 6B shows four first division lines LW1~LW4, and FIG. 6C shows five second division lines LQ1~LQ5.

For example, as shown in FIG. 6B, each first division line intersects at least one of the M middle lines LC, so that a plurality of first intersections corresponding to the first division lines are determined. It should be noted that because some of the middle lines are short, the first division lines do not necessarily intersect with the M middle lines LC. For example, the first division lines LW4 on the rightmost side shown in FIG. 6B do not intersect the middle line corresponding to the second character connected area (the second character connected area includes the characters "The", "information", "provided", "by", "you", "in", "this", "form", "will" etc.) located in the tenth row.

For example, the M middle lines LC may be straight lines or curved lines.

For example, for each first intersection among the plurality of first intersections, the deviation of each first intersection in the Y-axis direction is calculated and serves as the global adjustment offset of the first intersection. That is, the global adjustment offset of the first intersection includes the difference between the Y-axis coordinate value of the first intersection in the coordinate system and the Y-axis coordinate value of the character center point corresponding to the first intersection in the coordinate system (difference is the Y-axis coordinate value of the first intersection in the coordinate system minus the Y-axis coordinate value of the character center point corresponding to the first intersection in the coordinate system). For example, the character center point represents the center point of the character row where the first intersection is located.

For example, each second division line intersects with W first division lines, thereby determining a plurality of second intersections corresponding to the second division lines. As shown in FIG. 6C, each second division line intersects with four first division lines LW1~LW4. For each second intersection among the plurality of second intersections, the global adjustment offset of the second intersection includes the offset of the second intersection in the Y-axis direction in the coordinate system.

For example, based on W quadratic functions, the step of calculating the global adjustment offset of multiple second intersections includes: calculating the global adjustment offset of the multiple second intersections between the first division lines and the Q second division lines according to the quadratic function corresponding to the first division lines. For example, as shown in FIG. 6B and FIG. 6C, based on the quadratic function corresponding to the first division lines LW1, the global adjustment offset of the five intersections between the first division lines LW1 and the five second division lines LQ1~LQ5 can be calculated.

For example, if multiple second intersections are arranged as an intersection matrix of W*Q, a grid formed by a group of multiple second intersections is obtained. For example, when W and Q are both 30, the grid is a grid composed of 900 (30*30) second intersections.

For example, in some embodiments, the step of performing global correction processing on the input image to get an intermediate corrected image according to the global adjustment offset of the multiple second intersections includes: performing quadratic fitting on the global adjustment offset of the multiple second intersections to obtain the global displacement adjustment function; obtaining the global adjustment offset of each pixel in the input image according to the global displacement adjustment function; performing global correction processing on the input image based on the image interpolation algorithm according to the global adjustment offset of each pixel in the input image, thereby obtaining the intermediate corrected image.

For example, the image interpolation algorithms include nearest-neighbor, bilinear, bicubic and other algorithms.

For example, in some embodiments, the step of performing global correction processing on the binarized image to get an intermediate corrected image includes: performing global correction processing on the binarized image to obtain the binarized intermediate corrected image. The binarized intermediate corrected image is the final intermediate corrected image. In other embodiments, the step of performing global correction processing on the binarized image to get an intermediate corrected image includes: performing global correction processing on the binarized image first to obtain the binarized intermediate corrected image. Then, performing processing on the binarized intermediate corrected image to obtain the final intermediate corrected image. The final intermediate corrected image is a grayscale image or a color image.

Figure 7A:
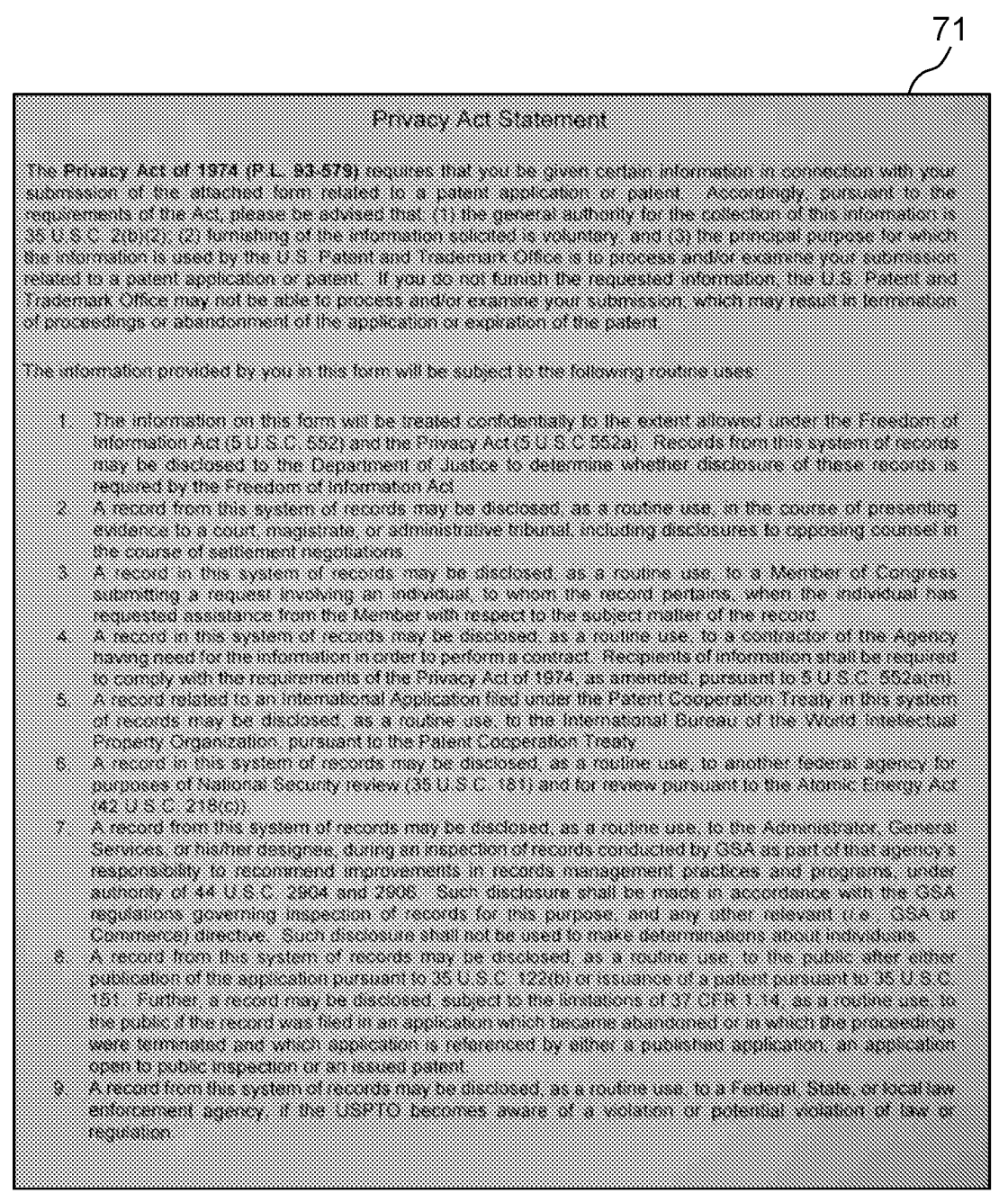

FIG. 7A is a schematic view of a target corrected image provided by some embodiments of the present disclosure.

For example, the target corrected image 71 shown in FIG. 7A is an image obtained by sequentially performing global correction and local correction on the input image 31 shown in FIG. 3. As shown in FIG. 7A, after processing the input image according to the processing method provided by the embodiment of the present disclosure, the characters in the character row are arranged in a row along the horizontal direction, and the character row lower boundary corresponding to the character row is substantially a straight line, and the straight line is substantially parallel to the horizontal direction.

Figure 7B:
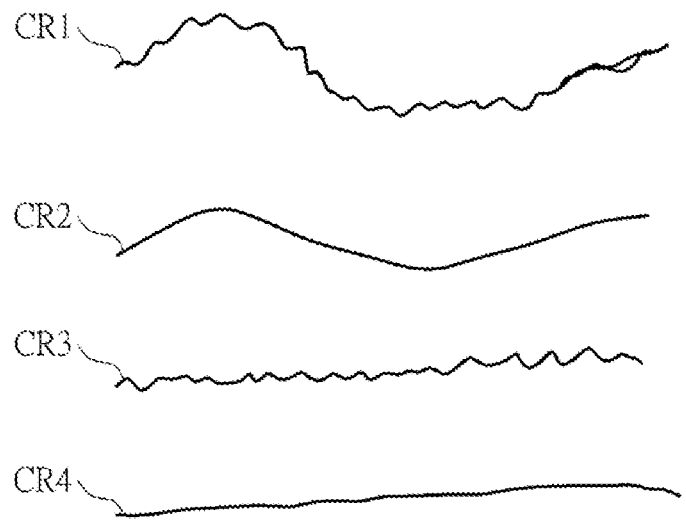
FIG. 7B is a schematic view showing a global correction and a local correction provided by some embodiments of the present disclosure.

For example, as shown in FIG. 7B, the first curve CR1 can represent the deviation of a character row; the second curve CR2 can represent the deviation captured by the global correction; the third curve CR3 can represent the result of the global correction. After the global correction, there are still details that have not been adjusted. The third curve CR3 can represent the details neglected in the global correction; the fourth curve CR4 can represent the result of the global correction plus the local correction.

Figure 8:
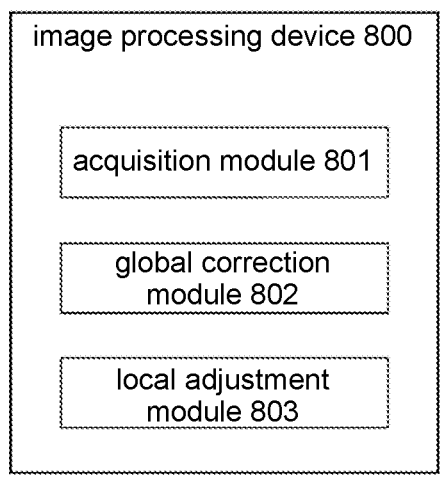
FIG. 8 is a schematic block view of an image processing device provided by at least one embodiment of the present disclosure.

At least one embodiment of the present disclosure further provides an image processing device. FIG. 8 is a schematic block view of an image processing device provided by at least one embodiment of the present disclosure.

For example, as shown in FIG. 8, the image processing device 800 includes an acquisition module 801, a global correction module 802, and a local adjustment module 803.

For example, the acquisition module 801 is used for obtaining an input image. The input image includes M character rows, each character row in the M character rows includes at least one character, and M is a positive integer.

The global correction module 802 is configured to perform global correction processing on the input image to get an intermediate corrected image.

The local adjustment module 803 is configured to make local adjustment on the intermediate corrected image to get the target corrected image.

For example, in some embodiments, when performing the local adjustment on the intermediate corrected image by the local adjustment module 803 to obtain the target corrected image, the local adjustment module 803 performs the following operations: determining the M character row lower boundaries corresponding to the M character rows according to the intermediate corrected image; determining the local adjustment reference line and M retention coefficient groups based on the intermediate corrected image and the M character row lower boundaries, wherein each retention coefficient group in the M retention coefficient groups includes multiple retention coefficients; determining M local adjustment offset groups corresponding to the M character rows according to the M character row lower boundaries, the local adjustment reference line and the M retention coefficient groups, wherein each local adjustment offset group in the M local adjustment offset groups includes multiple local adjustment offsets; performing local adjustment on the M character rows in the intermediate corrected image according to the M local adjustment offset groups to obtain the target corrected image.

For example, in some embodiments, the step of determining the M character row lower boundaries corresponding to the M character rows by the local adjustment module 803 according to the intermediate corrected image includes the following operations: performing character connection processing on the intermediate corrected image to obtain a first character connected image, wherein the first character connected image includes M first character connected areas corresponding to the M character rows; and determining the M character row lower boundaries corresponding to the M character rows according to the M first character connected areas and the intermediate corrected image.

For example, in some embodiments, the step of determining the M character row lower boundaries corresponding to the M character rows by the local adjustment module 803 according to the M first character connected areas and the intermediate corrected image includes the following operations: determining the M area lower boundaries corresponding to the M first character connected areas one-to-one; performing boundary fitting processing on the M character rows to obtain the M character row lower boundaries according to the M area lower boundaries and the intermediate corrected image.

For example, the M character rows include the i1-th character row, the i1-th character row corresponds to the first character connected area which corresponds to the lower boundary of the i1-th area in the M area lower boundaries, it is a positive integer less than or equal to M. The step of performing the boundary fitting process on the i1-th character row includes: obtaining multiple pixels of each character in the i1-th character row closest to the lower boundary of the i1-th area; removing the noise pixel in the multiple pixels to obtain the target pixel; performing linear or quadratic fitting on the target pixel to obtain the character row lower boundary corresponding to the i1-th character row.

For example, in some embodiments, the step of determining the M local adjustment offset groups corresponding to the M character rows by the local adjustment module 803 according to the M character row lower boundaries, the local adjustment reference line and the M retention coefficient groups includes the following operations: determining the M local adjustment reference points corresponding to the M character row lower boundaries according to the local adjustment reference line; for the i2-th character row lower boundary in the M character row lower boundaries, determining the local adjustment reference point corresponding to the i2-th character row lower boundary in the M local adjustment reference points, wherein i2 is a positive integer less than or equal to M; determining the i2-th character row corresponding to the i2-th character row lower boundary in the M character rows; determining the local character row area corresponding to the i2-th character row according to the height of the character rows and the i2-th character row; determining the multiple reference character offsets corresponding to the i2-th character row lower boundary according to the i2-th character row lower boundary and the local adjustment reference point corresponding to the i2-th character row lower boundary; in response to that the local character row area corresponding to the i2-th character row does not overlap the local character row area corresponding to any one of remaining character row in the M character rows, determining the local adjustment offset corresponding to each pixel in the local character row area corresponding to the i2-th character row according to the multiple reference character offsets corresponding to the i2-th character row and the retention coefficient group corresponding to the local character row area corresponding to the i2-th character row in the M retention coefficient groups, wherein the M local adjustment offset groups include a local adjustment offset group corresponding to the i2-th character row, and the local adjustment offset group corresponding to the i2-th character row includes the local adjustment offset corresponding to each pixel in the local character row area corresponding to the i2-th character row.

For example, in some embodiments, the step of determining the M local adjustment offset groups corresponding to the M character rows by the local adjustment module 803 according to the M character row lower boundaries, the local adjustment reference line and the M retention coefficient groups further includes the following operations: for the i3-th character row lower boundary in the M character row lower boundaries, determining the local adjustment reference point corresponding to the i3-th character row lower boundary in the M local adjustment reference points, wherein i3 is a positive integer less than or equal to M, i2 and i3 are not equal to each other; determining the i3-th character row corresponding to the i3-th character row lower boundary in the M character rows; determining the local character row area corresponding to the i3-th character row according to the height of the character row and the i3-th character row; determining the multiple reference character offsets corresponding to the i3-th character row according to the i3-th character row lower boundary and the local adjustment reference point corresponding to the i3-th character row lower boundary; in response to that the local character row area corresponding to the i2-th character row partially overlaps the local character row area corresponding to the i3-th character row: for the overlapped area between the local character row area corresponding to the i2-th character row and the local character row area corresponding to the i3-th character row, determining the local adjustment offset of each pixel in the overlapped area according to the multiple reference character offsets corresponding to the i2-th character row and the multiple reference character offsets corresponding to the i3-th character row, for each pixel in the non-overlapped area outside the overlapped area in the local character area corresponding to the i2-th character row, determining the local adjustment offset corresponding to each pixel in the non-overlapped area of the local character row area corresponding to the i2-th character row according to the multiple reference character offsets corresponding to the i2-th character row and the retention coefficient group corresponding to the local character row area corresponding to the i2-th character row in the M retention coefficient groups, wherein the M local adjustment offset groups and the local adjustment offset group corresponding to the i2-th character row include the local adjustment offset of each pixel in the non-overlapped area of the local character row area corresponding to the i2-th character row and the local adjustment offset of each pixel in the overlapped area; for each pixel in the non-overlapped area outside the overlapped area in the local character row area corresponding to the i3-th character row, determining the local adjustment offset corresponding to each pixel in the non-overlapped area in the local character row area corresponding to the i3-th character row according to the multiple reference character offsets corresponding to the i3-th character row and the retention coefficient group in the M retention coefficient groups corresponding to the local character row area corresponding to the i3-th character row, wherein the local adjustment offset group in the M local adjustment offset groups corresponding to the i3-th character row includes the local adjustment offset of each pixel in the non-overlapped area of the local character row area corresponding to the i3-th character row and the local adjustment offset of each pixel in the overlapped area.

For example, in some embodiments, the step of performing global correction processing on the input image by the global correction module 802 to obtain an intermediate corrected image includes the following operations: performing binarization processing on the input image to obtain a binarized image; performing character connection processing on the binarized image to obtain a second character connected image, wherein the second character connected image includes M second character connected areas corresponding to the M character rows; acquiring M middle lines corresponding to the M second character connected areas one-to-one, wherein the M second character connected areas are arranged along the first direction; setting W first division lines, wherein the W first division lines extend along the first direction; acquiring multiple first intersections between the M middle lines and the W first division lines; obtaining W quadratic functions corresponding to the W first division lines one-to-one based on the quadratic fitting performed on the multiple first intersections; setting the Q second division lines, wherein the Q second division lines extend along the second direction, and the first direction and the second direction are perpendicular to each other; obtaining multiple second intersections between the W first division lines and the Q second division lines; calculating the global adjustment offset of the multiple second intersections based on the W quadratic functions; performing global correction processing on the binarized image according to the global adjustment offset of the multiple second intersections to obtain the intermediate corrected image.

For example, the acquisition module 801, the global calibration module 802, and/or the local adjustment module 803 include codes and programs stored in memory. The processor can execute the codes and programs to realize some or all of the functions of the acquisition module 801, the global correction module 802 and/or the local adjustment module 803 described above. For example, the acquisition module 801, the global correction module 802, and/or the local adjustment module 803 may be special hardware devices to implement some or all of the functions of the acquisition module 801, the global correction module 802, and/or the local adjustment module 803 described above. For example, the acquisition module 801, the global correction module 802, and/or the local adjustment module 803 may be one circuit board or a combination of multiple circuit boards to implement the above-mentioned functions. In the embodiment of the present disclosure, the one circuit board or the combination of multiple circuit boards may include: (1) one or more processors; (2) one or more non-transitory memories connected to the processors; and (3) the firmware stored in the memory executable by the processor.

It should be noted that the acquisition module 801 is configured to implement the step S10 shown in FIG. 1, the global correction module 802 is configured to implement the step S11 shown in FIG. 1, and the local adjustment module 803 is configured to implement the step S12 shown in FIG. 1. Therefore, for the specific description of the functions implemented by the acquisition module 801, please refer to the related description of step S10 shown in FIG. 1 in the embodiment of the image processing method, and for the specific description of the functions implemented by the global correction module 802, please refer to the related description of step S11 shown in FIG. 1 in the embodiment of the image processing method, for the specific description of the functions implemented by the local adjustment module 803, please refer to the related description of step S12 shown in FIG. 1 in the embodiment of the image processing method. In addition, the image processing device can achieve similar technical effects as the aforementioned image processing method, and no further description is incorporated herein.

Figure 9:
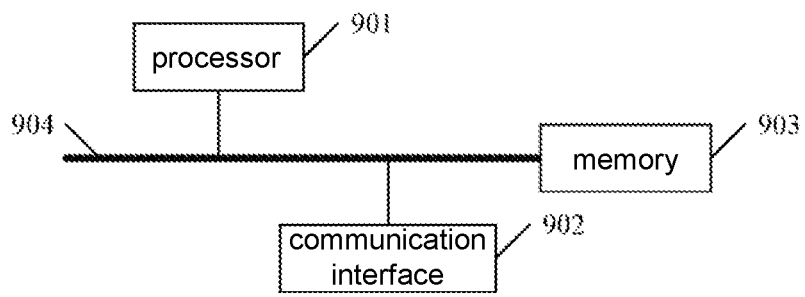
FIG. 9 is a schematic block view of an electronic device provided by at least one embodiment of the present disclosure.

At least one embodiment of the present disclosure further provides an electronic device. FIG. 9 is a schematic block view of an electronic device provided by at least one embodiment of the present disclosure.

For example, as shown in FIG. 9, the electronic device includes a processor 901, a communication interface 902, a memory 903, and a communication bus 904. The processor 901, the communication interface 902, and the memory 903 communicate with each other through the communication bus 904, and the processor 901, the communication interface 902, the memory 903 and other components can also communicate through a network connection. The present disclosure provides no limitation to the types and functions of the network here.

For example, the memory 903 is configured for non-transitory storage of computer-readable instructions. The processor 901 is configured to implement the image processing method described in any one of the foregoing embodiments when executing computer-readable instructions. For the specific implementation of each step of the image processing method and related description, please refer to the above-mentioned embodiment of the image processing method, and no further description is incorporated herein.

For example, other implementations of the image processing method implemented by the processor 901 by executing the program stored in the memory 903 are the same as the implementations mentioned in the foregoing embodiments of the image processing method, and no further description is incorporated herein.

For example, the communication bus 904 may be a peripheral component interconnection standard (PCI) bus or an extended industry standard architecture (EISA) bus. The communication bus can be classified into address bus, data bus, control bus, etc. For ease of illustration, the communication bus is only represented by a thick line in the drawing, but it does not mean that there is only one busbar or one type of busbar.

For example, the communication interface 902 is configured to implement communication between the electronic device and other devices.

For example, the processor 901 and the memory 903 may be provided on the server terminal (or the cloud).

For example, the processor 901 may control other components in the electronic device to perform desired functions. The processor 901 can be a central processing unit (CPU), a network processor (NP), etc., and can also be a digital signal processor (DSP), an application-specific integrated circuit (ASIC), a field programmable gate array (FPGA) or other programmable logic devices, discrete gates or transistor logic devices, discrete hardware components. The central processing unit (CPU) can be X86 or ARM architecture, etc.

For example, the memory 903 may include one or any combination of multiple computer program products, and the computer program products may include various forms of computer readable storage medium, such as volatile memory and/or non-volatile memory. Volatile memory may include, for example, random access memory (RAM) and/or cache memory (CACHE) and so on. Non-volatile memory may include, for example, read-only memory (ROM), hard disk, erasable programmable read-only memory (EPROM), portable compact disk read-only memory (CD-ROM), USB memory, flash drive, etc. One or more computer-readable instructions may be stored on the computer readable storage medium, and the processor 901 may run the computer-readable instructions to implement various functions of the electronic device. Various applications and various data can also be stored in the storage medium.

For example, for a detailed description of the process of performing image processing by the electronic device, reference may be made to the relevant description in the embodiment of the image processing method, and no further description is incorporated herein.

Figure 10:
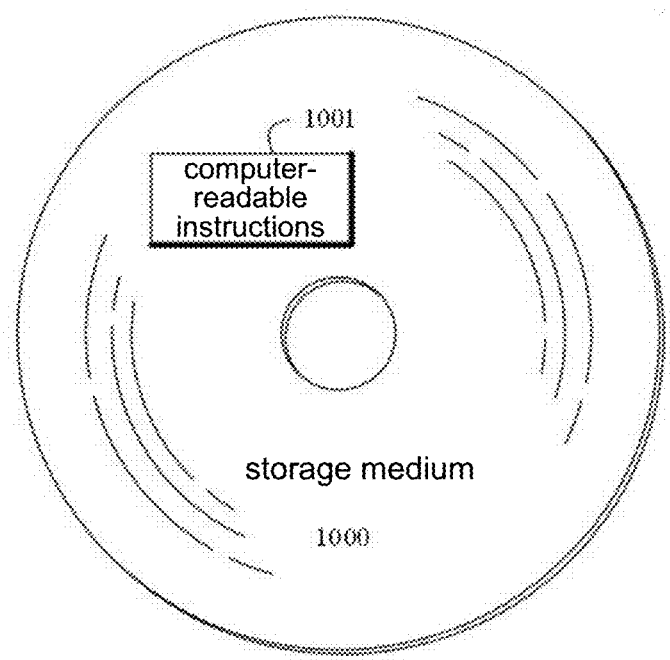
FIG. 10 is a schematic view of a non-transitory computer readable storage medium provided by at least one embodiment of the present disclosure.

FIG. 10 is a schematic view of a non-transitory computer readable storage medium provided by at least one embodiment of the present disclosure. For example, as shown in FIG. 10, one or more computer-readable instructions 1001 may be stored non-temporarily on the storage medium 1000. For example, when the computer-readable instructions 1001 are executed by a processor, one or more steps in the image processing method described above can be executed.

For example, the storage medium 1000 may be applied to the above-mentioned electronic device, for example, the storage medium 1000 may include the memory 903 in the electronic device.

For example, for the description of the storage medium 1000, please refer to the description of the memory in the embodiment of the electronic device, and no further description is incorporated herein.

For this disclosure, the following needs to be specified:

(1) The drawings of the embodiments of the present disclosure only refer to the structures related to the embodiments of the present disclosure, and other structures can refer to the common design.

(2) For clarity, in the drawings used to describe the embodiments of the present invention, the thickness and size of layers or structures are exaggerated. It can be understood that when an element such as a layer, film, region or substrate is referred to as being "on" or "under" another element, the element can be "directly" "on" or "under" another element, or an intermediate element may be located therebetween.

(3) As long as no conflict is generated, the embodiments of the present disclosure and the features in the embodiments can be combined with each other to obtain new embodiments.

The above are only specific implementations of the present disclosure, but the protection scope of the present disclosure is not limited thereto, and the protection scope of the present disclosure should be subject to the protection scope of the claims.

What is claimed is:

1. An image processing method, comprising:
obtaining an input image, wherein the input image comprises M character rows, and each of the M character rows comprises at least one character, and M is a positive integer;
performing a global correction processing on the input image to obtain an intermediate corrected image; and
performing a local adjustment on the intermediate corrected image to obtain a target corrected image,
wherein the step of performing the local adjustment on the intermediate corrected image to obtain the target corrected image comprises:
determining M character row lower boundaries corresponding to the M character rows according to the intermediate corrected image;
determining a local adjustment reference line and M retention coefficient groups based on the intermediate corrected image and the M character row lower boundaries, wherein each of the M retention coefficient groups comprises multiple retention coefficients;
determining M local adjustment offset groups corresponding to the M character rows according to the M character row lower boundaries, the local adjustment reference line and the M retention coefficient groups, wherein each of the M local adjustment offset groups comprises multiple local adjustment offsets; and
performing the local adjustment on the M character rows in the intermediate corrected image according to the M local adjustment offset groups to obtain the target corrected image.

2. The image processing method according to claim 1, wherein the step of determining the M character row lower boundaries corresponding to the M character rows according to the intermediate corrected image comprises:
performing a character connection processing on the intermediate corrected image to obtain a first character connected image, wherein the first character connected image comprises M first character connected areas corresponding to the M character rows; and
determining the M character row lower boundaries corresponding to the M character rows according to the M first character connected areas and the intermediate corrected image.

3. The image processing method according to claim 2, wherein the step of determining the M character row lower boundaries corresponding to the M character rows according to the M first character connected areas and the intermediate corrected image comprises:
determining M area lower boundaries corresponding to the M first character connected areas one-to-one; and
performing a boundary fitting processing on the M character rows to obtain the M character row lower boundaries according to the M area lower boundaries and the intermediate corrected image,
wherein the M character rows comprise an i1-th character row, the i1-th character row corresponds to the first character connected area which corresponds to a lower boundary of the it-th area in the M area lower boundaries, it is a positive integer less than or equal to M,
the step of performing the boundary fitting process on the i1-th character row comprises:
obtaining at least one pixel of each of the at least one character in the i1-th character row closest to the lower boundary of the i1-th area;
removing a noise pixel in the at least one pixel to obtain a target pixel; and
performing a linear or quadratic fitting on the target pixel to obtain the character row lower boundary corresponding to the i1-th character row.

4. The image processing method according to claim 1, wherein the step of determining the M local adjustment offset groups corresponding to the M character rows according to the M character row lower boundaries, the local adjustment reference line and the M retention coefficient groups comprises:
determining M local adjustment reference points corresponding to the M character row lower boundaries according to the local adjustment reference line;
for an i2-th character row lower boundary in the M character row lower boundaries, determining a local adjustment reference point corresponding to the i2-th character row lower boundary in the M local adjustment reference points, wherein i2 is a positive integer less than or equal to M;
determining an i2-th character row corresponding to the i2-th character row lower boundary in the M character rows;
determining a local character row area corresponding to the i2-th character row according to a height of the character row and the i2-th character row;
determining multiple reference character offsets corresponding to the i2-th character row lower boundary according to the i2-th character row lower boundary and the local adjustment reference point corresponding to the i2-th character row lower boundary; and in response to that the local character row area corresponding to the i2-th character row does not overlap a local character row area corresponding to any one of remaining character row in the M character rows, determining the local adjustment offset corresponding to each of pixels in the local character row area corresponding to the i2-th character row according to the multiple reference character offsets corresponding to the i2-th character row and the retention coefficient group corresponding to the local character row area corresponding to the i2-th character row in the M retention coefficient groups, wherein the M local adjustment offset groups comprise a local adjustment offset group corresponding to the i2-th character row, and the local adjustment offset group corresponding to the i2-th character row comprises the local adjustment offset corresponding to each of the pixels in the local character row area corresponding to the i2-th character row.

5. The image processing method according to claim 4, wherein the step of determining the M local adjustment offset groups corresponding to the M character rows according to the M character row lower boundaries, the local adjustment reference line and the M retention coefficient groups further comprises:

for an i3-th character row lower boundary in the M character row lower boundaries, determining a local adjustment reference point corresponding to the i3-th character row lower boundary in the M local adjustment reference points, wherein i3 is a positive integer less than or equal to M, i2 and i3 are not equal to each other;

determining an i3-th character row corresponding to the i3-th character row lower boundary in the M character rows;

determining a local character row area corresponding to the i3-th character row according to the height of the character row and the i3-th character row;

determining multiple reference character offsets corresponding to the i3-th character row according to the i3-th character row lower boundary and the local adjustment reference point corresponding to the i3-th character row lower boundary; and in response to that the local character row area corresponding to the i2-th character row partially overlaps the local character row area corresponding to the i3-th character row:

for an overlapped area between the local character row area corresponding to the i2-th character row and the local character row area corresponding to the i3-th character row, determining a local adjustment offset of each of pixels in the overlapped area according to the multiple reference character offsets corresponding to the i2-th character row and the multiple reference character offsets corresponding to the i3-th character row, for each of pixels in a non-overlapped area outside the overlapped area in a local character area corresponding to the i2-th character row, determining a local adjustment offset corresponding to each of the pixels in the non-overlapped area of the local character row area corresponding to the i2-th character row according to the multiple reference character offsets corresponding to the i2-th character row and the retention coefficient group corresponding to the local character row area corresponding to the i2-th character row in the M retention coefficient groups, wherein the local adjustment offset group corresponding to the i2-th character row in the M local adjustment offset groups comprises the local adjustment offset corresponding to each of the pixels in the non-overlapped area of the local character row area corresponding to the i2-th character row and the local adjustment offset of each of the pixels in the overlapped area; and for each of the pixels in the non-overlapped area outside the overlapped area in a local character row area corresponding to the i3-th character row, determining a local adjustment offset corresponding to each of the pixels in the non-overlapped area in the local character row area corresponding to the i3-th character row according to the multiple reference character offsets corresponding to the i3-th character row and the retention coefficient groups corresponding to the local character row area corresponding to the i3-th character row in the M coefficient groups, wherein the local adjustment offset group corresponding to the i3-th character row in the M local adjustment offset groups comprises the local adjustment offset corresponding to each of the pixels in the non-overlapped area of the local character row area corresponding to the i3-th character row and the local adjustment offset of each of the pixels in the overlapped area.

6. The image processing method according to claim 4, wherein the step of determining the M local adjustment reference points corresponding to the M character row lower boundaries according to the local adjustment reference line comprises:

for each of the M character row lower boundaries, under a condition that there is an intersection between the character row lower boundary and the local adjustment reference line, determining the local adjustment reference point corresponding to the character row lower boundary as the intersection; and under a condition that there is no intersection between the character row lower boundary and the local adjustment reference line, determining the local adjustment reference point corresponding to the character row lower boundary as a point on the character row lower boundary closest to the local adjustment reference line.

7. The image processing method according to claim 1, wherein a value range of the retention coefficient in each of the retention coefficient groups is 0 to 1, and the step of determining the M retention coefficient groups comprises:

for an i4-th character row in the M character rows, determining a local character row area corresponding to the i4-th character row, wherein i4 is a positive integer less than or equal to M;

for each of pixels in the local character row area, obtaining a point on the character row lower boundary corresponding to the i4-th character row closest to the pixel in the local character row area as a reference pixel, determining an attenuation value corresponding to the pixel in the local character row area according to a distance between the pixel in the local character row area and the reference pixel, and determining a retention coefficient corresponding to the pixel in the local character row area according to the attenuation value, thereby determining the retention coefficient group corresponding to the local character row area corresponding to the i4-th character row, wherein the M retention coefficient groups comprise the retention coefficient group corresponding to the local character row area corresponding to the i4-th character row.

8. The image processing method according to claim 1, wherein the M character rows are arranged along a first direction, and the step of determining the local adjustment reference line comprises:

using a middle line extending in along first direction in the intermediate corrected image as the local adjustment reference line.

9. The image processing method according to claim 1, wherein the step of performing the local adjustment on the M character rows in the intermediate corrected image according to the M local adjustment offset groups to obtain the target corrected image comprises:

determining a local character row area corresponding to the M character rows in the intermediate corrected image; and performing a linear local adjustment on pixels in the local character row area corresponding to the M character rows respectively to obtain the target corrected image according to the M local adjustment offset groups.

10. The image processing method according to claim 1, wherein the step of performing the global correction processing on the input image to obtain the intermediate corrected image comprises:

performing a binarization processing on the input image to obtain a binarized image;

performing a character connection processing on the binarized image to obtain a second character connected image, wherein the second character connected image comprises M second character connected areas corresponding to the M character rows;

acquiring M middle lines corresponding to the M second character connected areas one-to-one, wherein the M second character connected areas are arranged along the first direction;

setting W first division lines, wherein the W first division lines extend along the first direction;

acquiring multiple first intersections between the M middle lines and the W first division lines;

performing a quadratic fitting based on the multiple first intersections to obtain W quadratic functions corresponding to the W first division lines one-to-one;

setting Q second division lines, wherein the Q second division lines extend along a second direction, and the first direction and the second direction are perpendicular to each other;

obtaining multiple second intersections between the W first division lines and the Q second division lines;

calculating a global adjustment offset of the multiple second intersections based on the W quadratic functions; and performing the global correction processing on the binarized image according to the global adjustment offset of the multiple second intersections to obtain the intermediate corrected image.

11. The image processing method according to claim 10, wherein the step of performing the quadratic fitting based on the multiple first intersections to obtain the W quadratic functions corresponding to the W first division lines one-to-one comprises:

determining a coordinate system based on the input image, wherein the coordinate system comprises an X axis and a Y axis, the first direction is parallel to the Y axis, and the second direction is parallel to the X axis;

determining a coordinate value of multiple character center points corresponding to the multiple first intersections in the coordinate system;

calculating a global adjustment offset of the multiple first intersections based on the multiple character center points; and performing the quadratic fitting on the global adjustment offset of the multiple first intersections to obtain the W quadratic functions corresponding to the W first division lines one-to-one.

12. The image processing method according to claim 11, wherein for each of the multiple first intersections, the global adjustment offset of the first intersection comprises a difference between a Y-axis coordinate value of the first intersection in the coordinate system and a Y-axis coordinate value of the character center point corresponding to the first intersection in the coordinate system.

13. An image processing device, comprising:

an acquisition module configured to obtain an input image, wherein the input image comprises M character rows, and each of the M character rows comprises at least one character, and M is a positive integer;

a global correction module, configured to perform a global correction processing on the input image to obtain an intermediate corrected image; and a local adjustment module configured to perform a local adjustment on the intermediate corrected image to obtain a target corrected image;

wherein the step of performing local adjustment on the intermediate corrected image by the local adjustment module to obtain the target corrected image comprises the following operations:

determining M character row lower boundaries corresponding to the M character rows according to the intermediate corrected image;

determining a local adjustment reference line and M retention coefficient groups based on the intermediate corrected image and the M character row lower boundaries, wherein each of the M retention coefficient groups comprises multiple retention coefficients;

determining M local adjustment offset groups corresponding to the M character rows according to the M character row lower boundaries, the local adjustment reference line and the M retention coefficient groups, wherein each of the M local adjustment offset groups comprises multiple local adjustment offsets; and performing the local adjustment on the M character rows in the intermediate corrected image according to the M local adjustment offset groups to obtain the target corrected image.

14. The image processing device according to claim 13, wherein the operation of determining, by the local adjustment module, the M character row lower boundaries corresponding to the M character rows according to the intermediate corrected image comprises:

performing a character connection processing on the intermediate corrected image to obtain a first character connected image, wherein the first character connected image comprises M first character connected areas corresponding to the M character rows; and determining the M character row lower boundaries corresponding to the M character rows according to the M first character connected areas and the intermediate corrected image.

15. The image processing device according to claim 14, wherein the operation of determining, by the local adjustment module, the M character row lower boundaries corresponding to the M character rows according to the M first character connected areas and the intermediate corrected image comprises:
   determining M area lower boundaries corresponding to the M first character connected areas one-to-one; and
   performing a boundary fitting processing on the M character rows to obtain the M character row lower boundaries according to the M area lower boundaries and the intermediate corrected image,
   wherein the M character rows comprise an i1-th character row, the i1-th character row corresponds to the first character connected area which corresponds to a lower boundary of the it-th area in the M area lower boundaries, it is a positive integer less than or equal to M,
   the operation of performing the boundary fitting process on the i1-th character row comprises:
      obtaining at least one pixel of each of the at least one character in the i1-th character row closest to the lower boundary of the i1-th area;
      removing a noise pixel in the at least one pixel to obtain a target pixel; and
      performing a linear or quadratic fitting on the target pixel to obtain the character row lower boundary corresponding to the i1-th character row.

16. The image processing device according to claim 13, wherein the operation of determining, by the local adjustment module, the M local adjustment offset groups corresponding to the M character rows according to the M character row lower boundaries, the local adjustment reference line and the M retention coefficient groups comprises:
   determining M local adjustment reference points corresponding to the M character row lower boundaries according to the local adjustment reference line;
   for an i2-th character row lower boundary in the M character row lower boundaries, determining a local adjustment reference point corresponding to the i2-th character row lower boundary in the M local adjustment reference points, wherein i2 is a positive integer less than or equal to M;
   determining an i2-th character row corresponding to the i2-th character row lower boundary in the M character rows;
   determining a local character row area corresponding to the i2-th character row according to a height of the character row and the i2-th character row;
   determining multiple reference character offsets corresponding to the i2-th character row lower boundary according to the i2-th character row lower boundary and the local adjustment reference point corresponding to the i2-th character row lower boundary; and
   in response to that the local character row area corresponding to the i2-th character row does not overlap a local character row area corresponding to any one of remaining character row in the M character rows, determining the local adjustment offset corresponding to each of pixels in the local character row area corresponding to the i2-th character row according to the multiple reference character offsets corresponding to the i2-th character row and the retention coefficient group corresponding to the local character row area corresponding to the i2-th character row in the M retention coefficient groups, wherein the M local adjustment offset groups comprise a local adjustment offset group corresponding to the i2-th character row, and the local adjustment offset group corresponding to the i2-th character row comprises the local adjustment offset corresponding to each of the pixels in the local character row area corresponding to the i2-th character row.

17. The image processing device according to claim 16, wherein the operation of determining, by the local adjustment module, the M local adjustment offset groups corresponding to the M character rows according to the M character row lower boundaries, the local adjustment reference line and the M retention coefficient groups further comprises:
   for an i3-th character row lower boundary in the M character row lower boundaries, determining a local adjustment reference point corresponding to the i3-th character row lower boundary in the M local adjustment reference points, wherein i3 is a positive integer less than or equal to M, i2 and i3 are not equal to each other;
   determining an i3-th character row corresponding to the i3-th character row lower boundary in the M character rows;
   determining a local character row area corresponding to the i3-th character row according to the height of the character row and the i3-th character row;
   determining multiple reference character offsets corresponding to the i3-th character row according to the i3-th character row lower boundary and the local adjustment reference point corresponding to the i3-th character row lower boundary; and
   in response to that the local character row area corresponding to the i2-th character row partially overlaps the local character row area corresponding to the i3-th character row:
      for an overlapped area between the local character row area corresponding to the i2-th character row and the local character row area corresponding to the i3-th character row, determining a local adjustment offset of each of pixels in the overlapped area according to the multiple reference character offsets corresponding to the i2-th character row and the multiple reference character offsets corresponding to the i3-th character row;
      for each of pixels in a non-overlapped area outside the overlapped area in a local character area corresponding to the i2-th character row, determining a local adjustment offset corresponding to each of the pixels in the non-overlapped area of the local character row area corresponding to the i2-th character row according to the multiple reference character offsets corresponding to the i2-th character row and the retention coefficient group corresponding to the local character row area corresponding to the i2-th character row in the M retention coefficient groups, wherein the local adjustment offset group corresponding to the i2-th character row in the M local adjustment offset groups comprises the local adjustment offset corresponding to each of the pixels in the non-overlapped area of the local character row area corresponding to the i2-th character row and the local adjustment offset of each of the pixels in the overlapped area; and for each of the pixels in the non-overlapped area outside the overlapped area in a local character row area corresponding to the i3-th character row, determining a local adjustment offset corresponding to each of the pixels in the non-overlapped area in the local character row area corresponding to the i3-th character row according to the multiple reference character offsets corresponding to the i3-th character row and the retention coefficient groups corresponding to the local character row area corresponding to the i3-th character row in the M coefficient groups, wherein the local adjustment offset group corresponding to the i3-th character row in the M local adjustment offset groups comprises the local adjustment offset corresponding to each of the pixels in the non-overlapped area of the local character row area corresponding to the i3-th character row and the local adjustment offset of each of the pixels in the overlapped area.

18. The image processing device according to claim 13, wherein the operation of performing, by the global correction module, the global correction processing on the input image to get the intermediate corrected image comprises:
   performing a binarization processing on the input image to obtain a binarized image;
   performing a character connection processing on the binarized image to obtain a second character connected image, wherein the second character connected image comprises M second character connected areas corresponding to the M character rows;
   obtaining M middle lines corresponding to the M second character connected areas one-to-one, wherein the M second character connected areas are arranged along the first direction;
   setting W first division lines, wherein the W first division lines extend along the first direction;
   acquiring multiple first intersections between the M middle lines and the W first division lines;
   performing a quadratic fitting based on the multiple first intersections to obtain W quadratic functions corresponding to the W first division lines one-to-one;
   setting Q second division lines, wherein the Q second division lines extend along a second direction, wherein the first direction is perpendicular to the second direction;
   obtaining multiple second intersections between the W first division lines and the Q second division lines;
   calculating a global adjustment offset of the multiple second intersections based on the W quadratic functions; and
   performing the global correction processing on the binarized image according to the global adjustment offset of the multiple second intersections, so as to get the intermediate corrected image.

19. An electronic device, comprising:
   a memory, configured to store computer-readable instructions non-temporarily; and
   a processor, configured to execute the computer-readable instructions, wherein the image processing method as claimed in claim 1 is implemented when the computer-readable instructions are executed by the processor.

20. A non-transitory computer readable storage medium, wherein the non-transitory computer readable storage medium stores computer-readable instructions, wherein the image processing method as claimed in claim 1 is implemented when the computer-readable instructions are executed by a processor.

* * * * *